(12) United States Patent
Zhu et al.

(10) Patent No.: US 11,511,637 B2
(45) Date of Patent: Nov. 29, 2022

(54) INTEGRATED CHARGER AND MOTOR CONTROL SYSTEM

(71) Applicant: Huawei Digital Power Technologies Co., Ltd., Shenzhen (CN)

(72) Inventors: Huibin Zhu, Plano, TX (US); Heping Dai, Plano, TX (US); Yongtao Liang, Plano, TX (US); Weiping Liu, Plano, TX (US)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 67 days.

(21) Appl. No.: 17/061,252

(22) Filed: Oct. 1, 2020

(65) Prior Publication Data

US 2021/0016672 A1 Jan. 21, 2021

Related U.S. Application Data

(63) Continuation of application No. PCT/US2019/034014, filed on May 24, 2019.

(51) Int. Cl.
*B60L 53/22* (2019.01)
*B60L 50/61* (2019.01)

(52) U.S. Cl.
CPC .............. *B60L 53/22* (2019.02); *B60L 50/61* (2019.02); *B60L 2210/14* (2013.01); *B60L 2210/30* (2013.01)

(58) Field of Classification Search
CPC ...... B60L 53/22; B60L 50/61; B60L 2210/14; B60L 2210/30; B60L 2210/40; B60L 53/24; H02M 1/0058; H02M 1/0064; H02M 1/008; H02M 1/007; H02M 1/0085; H02M 1/0093; H02M 7/4807; H02M 1/10; H02M 1/4216; H02M 3/33561; H02M 7/487; H02J 7/0071; H02J 7/00714; H02J 7/02; H02J 2207/20; H02J 2310/48; Y02T 10/62;
(Continued)

(56) References Cited

U.S. PATENT DOCUMENTS

| 4,462,070 A | 7/1984 | Iida |
| 4,920,475 A | 4/1990 | Rippel |
| 6,445,079 B1 | 9/2002 | Gale et al. |

(Continued)

FOREIGN PATENT DOCUMENTS

| CN | 102216114 A | 10/2011 |
| CN | 102299535 A | 12/2011 |

(Continued)

OTHER PUBLICATIONS

International Preliminary Report on Patentability dated Dec. 2, 2021, International Application No. PCT/US2019/034014.

(Continued)

*Primary Examiner* — Paul Dinh

(74) *Attorney, Agent, or Firm* — Vierra Magen Marcus LLP

(57) ABSTRACT

According to one aspect of the present disclosure, there is provided an apparatus that includes first, second, and third power converter stages connected to a transformer module. At least one of the first, second, and third power converter stages is a multi-level power converter stage that has multiple configurations to generate different output voltages from an input voltage.

20 Claims, 21 Drawing Sheets

(58) Field of Classification Search
CPC ..... Y02T 10/70; Y02T 10/7072; Y02T 10/92; Y02T 90/14; Y02T 10/72
USPC .......................................................... 320/140
See application file for complete search history.

(56) References Cited

U.S. PATENT DOCUMENTS

| | | | |
|---|---|---|---|
| 6,737,822 B2 | 5/2004 | King | |
| 6,831,442 B2 | 12/2004 | Hsu et al. | |
| 7,092,267 B2 | 8/2006 | Carlson et al. | |
| 7,154,237 B2 | 12/2006 | Welchko et al. | |
| 7,199,535 B2 | 4/2007 | Welchko et al. | |
| 7,362,597 B2 | 4/2008 | Ishikawa et al. | |
| 7,733,039 B2 | 6/2010 | Su | |
| 7,746,670 B2 | 6/2010 | Kawasaki et al. | |
| 7,847,437 B2 | 12/2010 | Chakrabarti et al. | |
| 7,848,118 B2 | 12/2010 | Shimada et al. | |
| 7,969,104 B2 | 6/2011 | Taniguchi | |
| 8,013,553 B2 | 9/2011 | Taniguchi | |
| 8,030,884 B2 | 10/2011 | King et al. | |
| 8,040,089 B2 | 10/2011 | Sakai | |
| 8,053,915 B2 | 11/2011 | Umeda et al. | |
| 8,080,973 B2 | 12/2011 | King et al. | |
| 8,096,377 B2 | 1/2012 | Sato | |
| 8,183,820 B2 | 5/2012 | Anwar et al. | |
| 8,198,855 B2 | 6/2012 | Fukui et al. | |
| 8,258,744 B2 | 9/2012 | Ishii et al. | |
| 8,278,859 B2 | 10/2012 | Sakai | |
| 8,288,887 B2 | 10/2012 | Ransom et al. | |
| 8,289,743 B2 | 10/2012 | Sato | |
| 8,299,748 B2 | 10/2012 | Soma et al. | |
| 8,310,181 B2 | 11/2012 | Taniguchi et al. | |
| 8,350,523 B2 | 1/2013 | Kajouke et al. | |
| 8,410,635 B2 | 4/2013 | Ransom | |
| 8,421,271 B2 | 4/2013 | King et al. | |
| 8,441,224 B2 | 5/2013 | Sumi et al. | |
| 8,466,658 B2 | 6/2013 | Kajouke et al. | |
| 8,610,383 B2 | 12/2013 | De Sousa et al. | |
| 8,629,636 B2 | 1/2014 | Bouchez et al. | |
| 8,803,469 B2 | 8/2014 | Briane et al. | |
| 8,917,046 B2 | 12/2014 | Briane et al. | |
| 9,025,345 B2 | 5/2015 | Shimada et al. | |
| 9,035,608 B2 | 5/2015 | Loudot et al. | |
| 9,120,390 B2 | 9/2015 | King et al. | |
| 9,153,996 B2 | 10/2015 | De Sousa et al. | |
| 9,166,415 B2 | 10/2015 | Moki et al. | |
| 9,227,518 B2 | 1/2016 | Fukushige | |
| 9,290,097 B2 | 3/2016 | Steigerwald et al. | |
| 9,350,179 B2 | 5/2016 | Ando et al. | |
| 9,391,472 B2 | 7/2016 | Iyasu et al. | |
| 9,469,204 B2 | 10/2016 | Gati et al. | |
| 9,509,211 B2 | 11/2016 | Shoyama et al. | |
| 9,520,741 B2 | 12/2016 | Kanakabasai | |
| 9,559,620 B2 | 1/2017 | Zushi et al. | |
| 9,614,442 B2 | 4/2017 | Chen et al. | |
| 9,620,974 B2 | 4/2017 | King et al. | |
| 9,641,008 B2 | 5/2017 | Gati et al. | |
| 9,718,376 B2 | 8/2017 | Chemin et al. | |
| 9,793,836 B2 | 10/2017 | Bouchez et al. | |
| 9,960,687 B2 | 5/2018 | Elasser et al. | |
| 9,973,110 B2 | 5/2018 | Sadki et al. | |
| 10,097,106 B1 | 10/2018 | Takagi | |
| 10,110,103 B1 | 10/2018 | Hao et al. | |
| 10,116,221 B2 | 10/2018 | Iwaya et al. | |
| 10,224,827 B1 | 3/2019 | Zhu et al. | |
| 2009/0033253 A1 | 2/2009 | Nagashima et al. | |
| 2009/0171521 A1 | 7/2009 | Moki et al. | |
| 2011/0187185 A1 | 8/2011 | Dupuy | |
| 2014/0097792 A1 | 4/2014 | Su | |
| 2014/0225432 A1 | 8/2014 | Geyer | |
| 2016/0121741 A1* | 5/2016 | Kim | B60L 53/20 318/139 |
| 2017/0117731 A1 | 4/2017 | Shimada et al. | |
| 2017/0246958 A1 | 8/2017 | Song et al. | |
| 2017/0327103 A1 | 11/2017 | Lim et al. | |
| 2017/0358987 A1 | 12/2017 | Oouchi et al. | |
| 2018/0241306 A1 | 8/2018 | Takahashi et al. | |
| 2018/0241313 A1 | 8/2018 | Goto et al. | |
| 2021/0155100 A1* | 5/2021 | Khaligh | H02M 7/797 |

FOREIGN PATENT DOCUMENTS

| | | |
|---|---|---|
| CN | 105191117 A | 12/2015 |
| DE | 102015101093 A1 | 7/2016 |
| EP | 0237602 A1 | 9/1987 |
| EP | 2400636 A1 | 12/2011 |
| EP | 2580085 B1 | 4/2014 |
| EP | 2992585 B1 | 5/2017 |
| EP | 2367704 B1 | 9/2017 |
| EP | 2367705 B1 | 9/2018 |
| EP | 3183795 B1 | 12/2018 |
| EP | 2751914 B1 | 12/2019 |
| FR | 3018244 A1 | 3/2014 |
| FR | 3001843 A1 | 8/2014 |
| FR | 3026242 A1 | 9/2014 |
| FR | 3026243 A1 | 9/2014 |
| FR | 3029708 A1 | 12/2014 |
| FR | 3059276 A1 | 11/2016 |
| FR | 3061819 | 1/2017 |
| WO | 2010057892 A1 | 5/2010 |
| WO | 2013030479 A2 | 3/2013 |
| WO | 2014068245 A2 | 5/2014 |

OTHER PUBLICATIONS

PCT/US2019/034014—International Search Report and Written Opinion dated Aug. 19, 2019, 11 pages.

Lacroix, Samantha, Eric Labouré, and Mickaël Hilairet. "An integrated fast battery charger for electric vehicle." In 2010 IEEE Vehicle Power and Propulsion Conference, pp. 1-6. IEEE, 2010.

Solero, Luca. "Nonconventional on-board charger for electric vehicle propulsion batteries." IEEE Transactions on vehicular technology 50, No. 1 (2001): 144-149 (Abstract, 1 page).

Haghbin, Saeid, Sonja Lundmark, Mats Alakula, and Ola Carlson. "An isolated high-power integrated charger in electrified-vehicle applications." IEEE Transactions on Vehicular Technology 60, No. 9 (2011): 4115-4126 (Abstract, 1 page).

Button, Robert M. "An advanced photovoltaic array regulator module." In IECEC 96. Proceedings of the 31st Intersociety Energy Conversion Engineering Conference, vol. 1, pp. 519-524. IEEE, 1996.

Paplicki, Piotr, and Rafał Piotuch. "Improved control system of pm machine with extended field control capability for EV drive." In Mechatronics-Ideas for Industrial Application, 8 pages. Springer, Cham, 2015.

SAE Electric Vehicle Conductive Charge Coupler, SAE J1772, Rev. Aug. 2001, 30 pages.

U. Anwar, H. Kim, H. Chen, R. Erickson, D. Maksimovic and K. K. Afridi, "A high power density drivetrain-integrated electric vehicle charger," 2016 IEEE Energy Conversion Congress and Exposition (ECCE), Milwaukee, WI, 2016, pp. 1-8, doi: 10.1109/ECCE.2016.7854694.

* cited by examiner

INTEGRATED CHARGER AND MOTOR CONTROL SYSTEM

CLAIM OF PRIORITY

This application is a continuation of and claims the benefit of priority to International Application No. PCT/US2019/034014, filed May 24, 2019, the entire contents of which are hereby incorporated by reference.

FIELD

The disclosure generally relates to the field of electric power circuits such as electric power circuits used in electric vehicles.

BACKGROUND

Electric power circuits include AC to DC power converters, as well as DC to DC power converters. Electric power converters have a wide range of uses including, but not limited to, use in an On-Board Charger (OBC) to charge a battery of an Electric Vehicle (EV). Electric power converters are potentially dangerous due to high voltages and currents. Isolation may reduce danger and may be required by some safety standards.

An electric motor, such as a motor of an EV, may be controlled by a Motor Control Unit (MCU). For example, an MCU may control an electric current from a battery to an electric motor of an EV.

BRIEF SUMMARY

According to one aspect of the present disclosure, there is provided an apparatus that includes a first power converter stage, a second power converter stage and a third power converter stage coupled to a transformer module. At least one of the first, second, and third power converter stages is a multi-level power converter stage that has multiple configurations to generate different output voltages from an input voltage.

Optionally, in the preceding aspect, the first power converter stage is a multi-level power converter stage, the second power converter stage is a multi-level power converter stage (e.g. three-level converter), and the third power converter stage is a two-level converter (e.g., full-bridge converter).

Optionally, in any of the preceding aspects, the apparatus includes a rectifier and boost circuit coupled between the external power port and the first power converter stage to rectify and boost an alternating current (AC) input from the external power port to provide a direct current (DC) input to the first power converter stage. Optionally, the external power source can be DC power connecting directly to the first power converter stage.

Optionally, in any of the preceding aspects, the external power port is coupled to the battery port through the first and second power converter stages and the transformer module to charge a battery coupled to the battery port using external power received at the external power port.

Optionally, in any of the preceding aspects, the battery port is coupled to the electric motor port through the second and third power converter stages and the transformer module to provide power to an electric motor coupled to the electric motor port using power from a battery coupled to the battery port. For example, the electric motor port may be coupled to an inverter (i.e., voltage-source type inverter) that generates PWM voltage output across the electric motor windings and continuously controls the motor winding currents during operation.

Optionally, in any of the preceding aspects, the third power converter stage includes output terminals coupled in series with the battery port to generate an output voltage to the electric motor port that is equal to battery port voltage from the battery plus an output voltage of the third power converter stage.

Optionally, in any of the preceding aspects, the apparatus includes a processor coupled to the first, second, and third power converter stages to select a configuration for the multi-level power converter stage for generating appropriate input and output voltage levels in order to maximize the power conversion efficiency.

Optionally, in any of the preceding aspects, the first and second power converter stages and the transformer module form a resonant converter having a resonant frequency, the processor configured to select the configuration to maintain an operating frequency that is near the resonant frequency.

Optionally, in any of the preceding aspects, the transformer module consists of a transformer with a first winding coupled to the first power converter stage, a second winding coupled to the second power converter stage, and a third winding coupled to the third power converter stage, the first winding, the second winding, and the third winding wound about a common core.

Optionally, in any of the preceding aspects, the transformer module consists of a first transformer with a first winding coupled to the first power converter stage and a second winding coupled to the second power converter stage, and a second transformer with a third winding coupled to the third power converter stage and a fourth winding coupled to the second power converter stage, the first and second windings wound on a first core in the first transformer and the third and fourth windings wound on a second core in the second transformer.

Optionally, in any of the preceding aspects, the apparatus is in an electric vehicle that includes an electric motor to propel the electric vehicle, the electric motor coupled to the electric motor port, and includes one or more batteries coupled to the battery port to power the electric motor.

According to one other aspect of the present disclosure, there is provided a method that includes receiving power from an external source, transferring power through a first power converter stage to a transformer module, and transferring power from the transformer module through a second power converter stage to a battery. The method further includes subsequently transferring stored power from the battery through the second power converter stage to the transformer module and transferring power from the transformer module through a third power converter stage to an electric motor. At least one of the first power converter stage, the second power converter stage, and the third power converter stage is configured to provide transferred power at a selected voltage.

Optionally, in any of the preceding aspects, configuring includes configuring the first power converter stage in one of a plurality of available configurations and configuring the second power converter stage in one of the plurality of available configurations according to a voltage of the power from the external source to provide power to the battery at a predetermined voltage.

Optionally, in any of the preceding aspects, receiving power from the external source includes receiving power as alternating current (AC) at a supply voltage, the method further comprising rectifying and boosting to obtain a direct current (DC) voltage that is higher than the supply voltage, the DC voltage provided to the first power converter stage.

Optionally, in any of the preceding aspects, transferring power from the external source through the first power converter stage to the transformer module includes inverting the DC voltage to obtain a corresponding AC voltage and providing the corresponding AC voltage to the transformer module.

Optionally, in any of the preceding aspects, the first power converter stage, the transformer module, and the second power converter stage form a resonant converter having a resonance frequency, and the method includes detecting a supply voltage of the power from the external source and configuring the first power converter stage to generate the corresponding AC voltage having a frequency at or near the resonance frequency.

Optionally, in any of the preceding aspects, the method includes, while transferring power through the third power converter stage to generate a configurable voltage, transferring stored power from the battery at a battery voltage, combining the battery voltage in series with the configurable voltage to obtain a combined voltage, and providing the combined voltage to the electric motor.

According to still one other aspect of the present disclosure, there is provided an electric vehicle that includes an external power port to receive electrical power from an external power source, an electric motor to provide propulsion of the electric vehicle, a battery to store power from the external power source and to provide stored power to the electric motor, and an on-board charger and motor control unit (OBC/MCU). The on-board charger and motor control unit includes a transformer, a first power converter stage connected between the transformer and the external power port, a second power converter stage connected between the transformer and the battery and a third power converter stage connected between the transformer and the electric motor. At least the first power converter stage and the second power converter stage are three-level power converter stages that have multiple configurations to generate different output voltages from an input voltage.

Optionally, in any of the preceding aspects, a processor is coupled to select configurations for the first power converter stage and the second power converter stage according to a voltage received at the external power port.

Optionally, in any of the preceding aspects, the first power converter stage, the transformer, and the second power converter stage form a resonant converter with a resonance frequency, the processor coupled to select the configurations to convert the voltage received at the external power port to a battery charging voltage with frequency of the resonant converter close to the resonance frequency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1A:
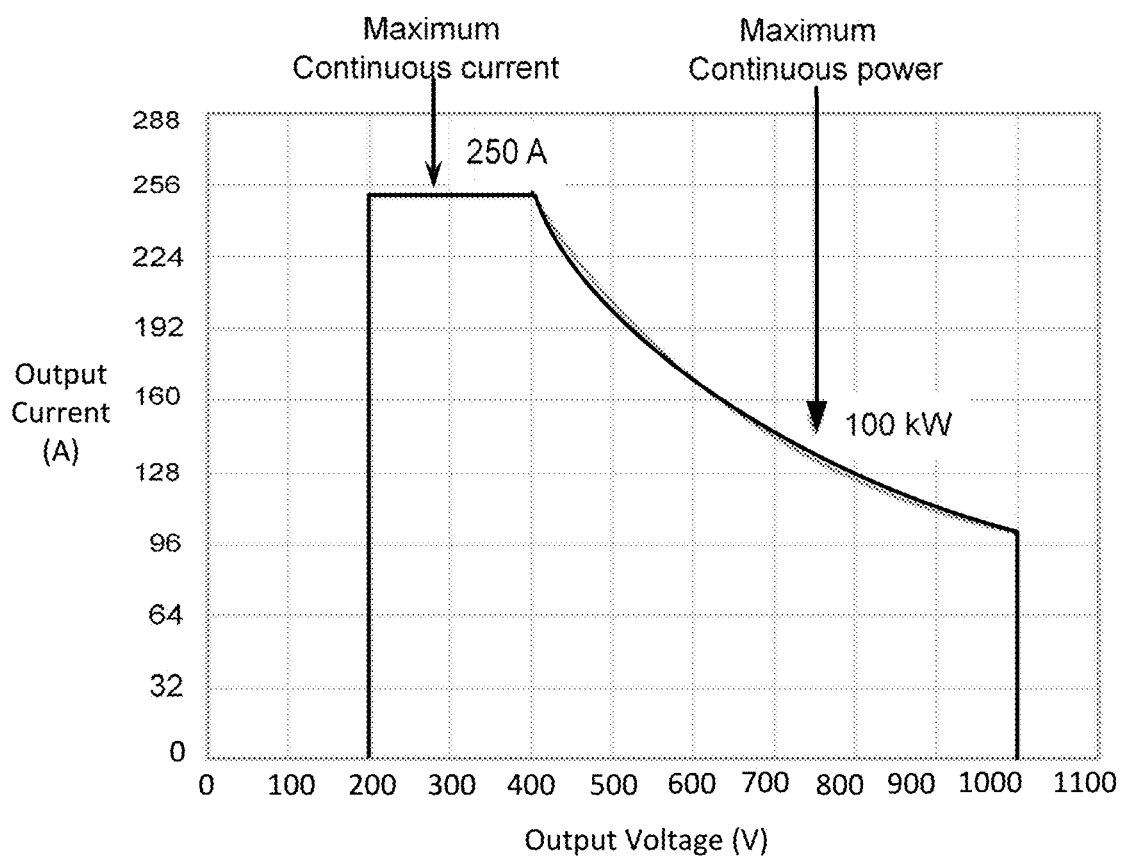
FIG. 1A illustrates output voltage and current of a charging station.

The present disclosure will now be described with reference to the figures, which in general relate to electric power circuits that may be used, for example, in an electric vehicle. For example, circuits described here may be used for charging a battery from an external source and for controlling power to an electric motor from the battery. Using shared circuitry to perform such different functions is efficient and may save cost. Examples include using a three-port power converter that includes three power converter stages coupled to a transformer module to transfer power between three ports (e.g. ports for external power, a battery, and an electric motor of an electric vehicle). The three power converter stages may be configured to transfer and convert power between any two ports in an efficient and adaptive manner.

In an electric vehicle, a three-port power converter may be used to convert power received from an external power source (e.g. charging station) to a suitable form for charging an electric vehicle battery (e.g. converting an alternating current (AC) provided at a supply voltage to a direct current (DC) for battery charging at a voltage different to the supply voltage). The same three-port power converter may be used to convert power from the battery for use by the electric vehicle's electric motor (e.g. converting from a battery voltage to a suitable voltage for the electric motor, which may vary according to conditions). Power transfer between ports may be in either direction (e.g. power transfer from motor to battery during braking, power transfer from the battery to an external power consumer e.g. as backup when domestic power is unavailable such as camping, or emergency use).

One or more of the power converter stages used may be multi-level power converter stages that are configurable to provide two or more different output voltages from a given input voltage. Using such multi-level power converter stages provides flexibility in power conversion, for example, allowing compatibility with external power sources that deliver power at a range of different voltages (e.g. an electric vehicle may be able to adapt to different charging stations that output different voltages and/or domestic power outlets in different countries).

In general, power conversion between any two ports of a three-port power converter may go through two power converter stages and a transformer, which may form a resonant converter in some examples. Such a resonant converter may have a resonance frequency and its efficiency may be high when it is operated close to the resonance frequency and may be low when it is operated far from its resonance frequency. Using one or more multi-level power converter stages allows voltage conversion over a range of voltages while using a frequency at or near the resonance frequency of such a converter (e.g. adapting to different supply voltages by reconfiguring one or more power converter stages without changing frequency, or with relatively small changes to frequency).

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

The Electric Vehicle (EV) and Hybrid EV (EV/HEV) market is a fast-growing segment and demands a wide deployment of fast chargers with many challenges, where state-of-the-art charger design may typically involve the following examples of common practices and associated drawbacks:

1. Universal EV voltage compatibility with isolation: As shown in FIG. 1A, EV fast chargers need to be capable of charging EV batteries using a very wide DC voltage range, e.g., 200V-1000V DC as shown (output voltage (V) along x-axis with output current (A) on y-axis). A charger station owner may require that the same charger can operate with a wide variety of customer EV/HEV's for capital investment reasons. However, designing power supply output voltage range (e.g., 1:4 or 1:5 ratio) is quite challenging.
2. Full power capability at low output voltage level: When charging at low battery voltage, a charger needs to deliver the same power capability in order to reduce vehicle charging time. Fast charger power rating may be up to 100 kW, or greater in some cases. However, typical charger converter power capability may drop at lower output voltage due to components' current ratings. Otherwise, significant component margins may be required, thus incurring much more cost and larger packaging size.
3. High efficiency under low load power condition: When battery charging cycle is at a late stage and charging current diminishes accordingly, an EV charger may operate at a low load power level. However, typical AC-DC power converter efficiency drops significantly at low load power. Therefore, improved charger operating efficiency (e.g., >96% or above) is generally desired for station operating economics.
4. Modular design and scale of economy: From cost point of view, it is desirable that high-power fast chargers are built in modular designs as building blocks, so it can be easy to configure multiple modules in parallel and scale up the power ratings. This also requires that charger module can handle different AC input voltage levels to address the global market. However, this is very challenging and major vendors have to offer different module designs for different parts of the world. And this implies a cost penalty.
5. High reliability and low maintenance: Commercial charger units may require less repair or replacement of key components, such as cooling fans, mechanical contactors or relays, etc. Solid-state switching components are usually more dependable with longer service lifetime. Some chargers on the market have to use DC contactors to switch modules between series and parallel operation. While this solution is effective to achieve universal charging voltage range, DC contactors are bulky and costly with limited operating lifetime. Technology improvement may provide a better choice than DC contactors.

Figure 1B:
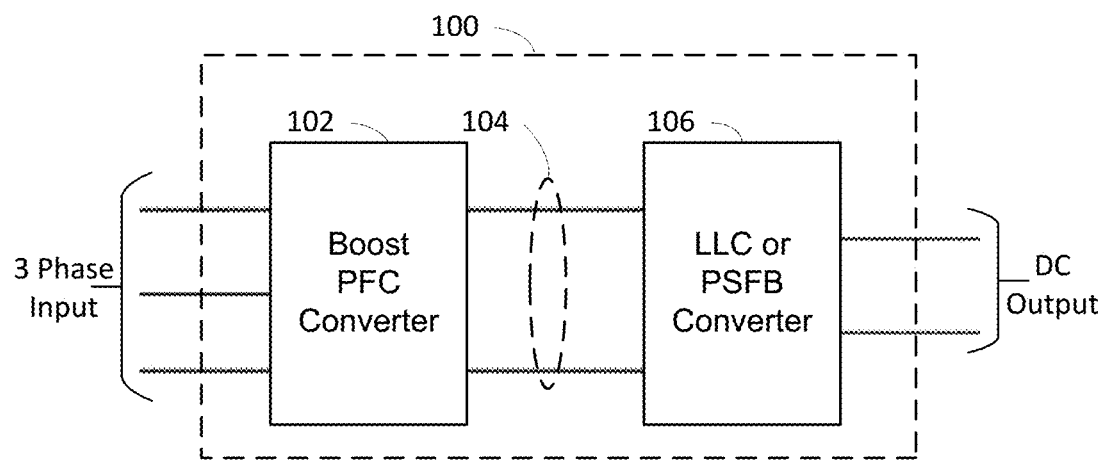
FIG. 1B illustrates an example of a two-stage fast charger.

FIG. 1B shows an example of a 2-stage fast charger 100, where a Boost Power Factor Correction (PFC) converter 102 receives power (as a 3-phase AC input in this example), regulates a variable voltage across a DC bus 104 that feeds power to a High Frequency (HF) isolated LLC converter 106 (or PSFB converter), which provides a DC output. In general, LLC converter modulation can only deliver a small range of output voltage and load power level efficiently; otherwise, its efficiency would deteriorate significantly (e.g. outside limited ranges, efficiency may drop significantly). Therefore, in this arrangement, it may be important to control DC bus voltage up and down to a desired operating setpoint in order to help LLC converter 106 to deliver better efficiency across the wide range of output voltage and load power levels.

An active PFC converter may have a peak efficiency (e.g. around 98% or lower), which may cause a major loss in total charger efficiency. Furthermore, even with PFC actively controlling a bus voltage setpoint, LLC converter 106 still may not be able to provide wide enough regulation range for EV load applications due to the efficiency drop issue. In addition, a full-power rated Pulse Width Modulation (PWM) switching Boost PFC incurs major cost because of items such as fast-switching MOSFET/IGBT and magnetic components.

In view of the limitations of the arrangement of FIG. 1B, technology improvement is desirable to provide a range of benefits in areas including specification range, efficiency performance, and cost savings.

Generally, EVs should be able to charge their batteries from at least two different power sources, e.g., DC power from a charging station, and AC power from the utility AC grid. Therefore, EV on-board power systems may include both DC and AC charging circuits, in addition to an MCU circuit that operates the EV motor during traction mode.

EV power systems are sensitive to component dimension, weight, and converter efficiency. Power switching devices, such as Gallium Nitride (GaN) and Silicon Carbide (SiC) devices may be used for efficiency, dimension and weight benefits. Also integrating may provide further gains in cost and dimensions.

Charging of EV batteries may include use of an On-Board Charging (OBC) circuit. Power from the battery may be used to power one or more electric motors to propel the electric vehicle under control of a Motor Control Unit (MCU) circuit. In some cases, certain components may be shared by these circuits, which may reduce cost and promote efficiency. Integration of OBC & MCU circuits using advanced high-frequency circuit topology and using common power converter stages (e.g. power bridges) between OBC & MCU may reduce the overall EV power system cost, size, and weight. These solutions may address those technology challenges with OBC & MCU integration, namely, having different power rating, isolation requirement, and wide voltage range.

Figure 2A:
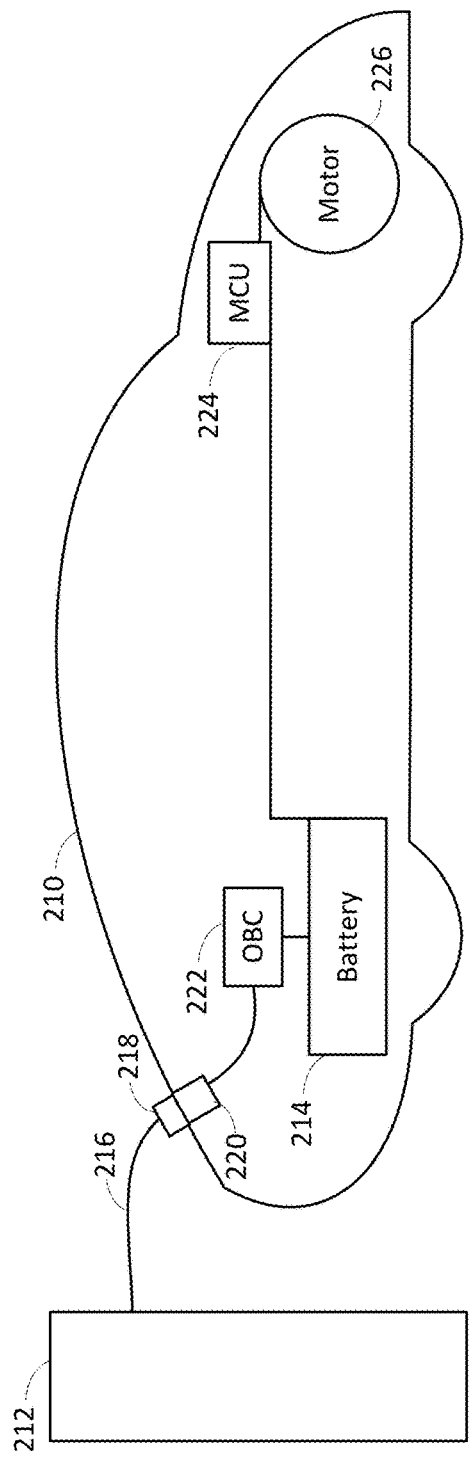
FIG. 2A is a diagram of one embodiment of an Electric Vehicle (EV).

FIG. 2A shows an example of an EV 210 connected to a charging station 212 to recharge a battery 214 of EV 210. An electric cable 216 extends from charging station 212 and ends with a connector 218 which couples with a corresponding connector 220 of EV 210. An OBC circuit 222 is coupled to connector 220 to receive power from an external source (charging station 212 in this example) and to use the power to charge battery 214 (e.g. converting AC to DC and controlling voltage and current provided to battery 214). Battery 214 is coupled to provide electric power to MCU 224, which controls electrical power provided to electric motor 226 (e.g. converting DC from battery 214 to AC and controlling voltage and current provided to electric motor 226).

Figure 2B:
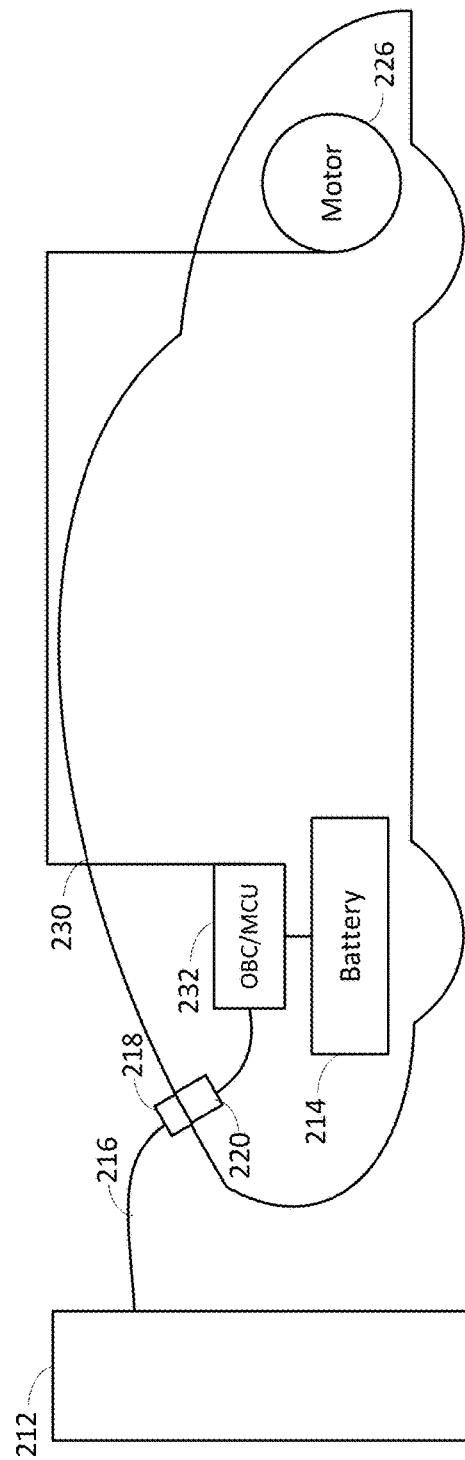
FIG. 2B is a diagram of an embodiment an EV with an OBC/MCU circuit.

FIG. 2B shows an example of another EV 230 connected to charging station 212 through electric cable 216 and connector 218, which connects to connector 220 (similar reference numbers are used for corresponding components of EVs 210, 230). An OBC/MCU circuit 232 is coupled to connector 220 to receive power from an external source (charging station 212 in this example) and to use the power to charge battery 214 (e.g. converting AC to DC and controlling voltage and current provided to battery 214 similarly to OBC 222). Battery 214 is coupled to provide electric power to OBC/MCU circuit 232, which controls electrical power provided to electric motor 226 (e.g. converting DC from battery 214 to AC and controlling voltage and current provided to electric motor 226 similarly to MCU 224). Thus, OBC/MCU circuit 232 of EV 230 combines functions of OBC 222 and MCU 224 of EV 210. Such a combined circuit provides some cost, weight, and space savings and may improve efficiency. Aspects of the present technology are applicable to such combined circuits (although not limited to only such circuits). While the examples of FIGS. 2A-B show charging from charging station 212, it will be understood that other power sources may be used for charging including a domestic AC supply, solar panels, or a generator (including a generator of a HEV).

Figure 2C:
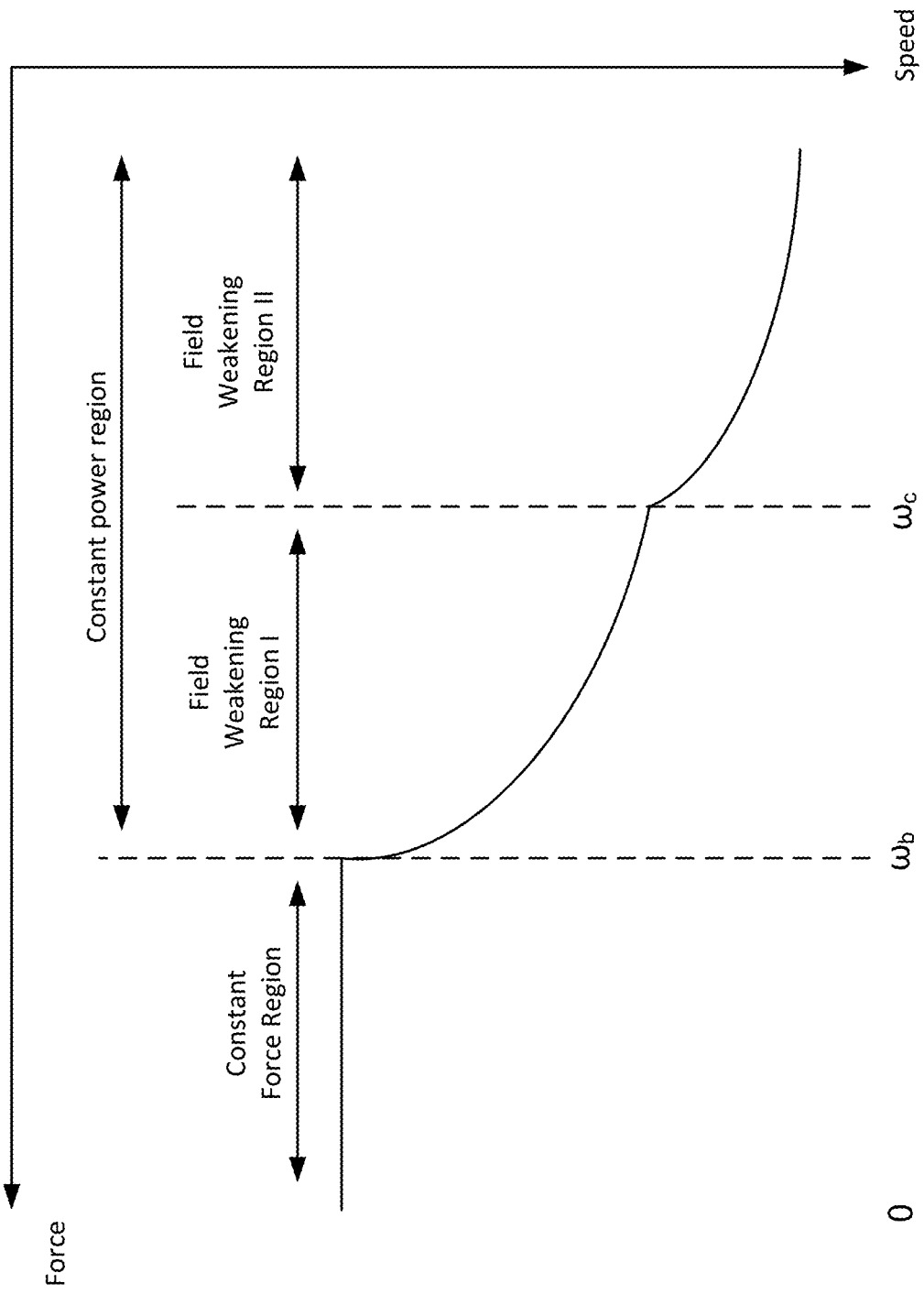
FIG. 2C illustrates operating range of an electric motor in an EV.

Operating an electric motor in an EV efficiently over its operating range can be challenging. FIG. 2C illustrates an example of a force curve for an electric motor over its full operating range (from speed=0 to a maximum speed) with speed (angular velocity) on the x-axis and force along the y-axis. The range can be divided into regions as illustrated, including a constant force region (where speed w is in the range: $0<\omega<\omega_b$) and a constant power region. The constant power region includes field weakening region I or "partial field weakening region" (where speed ω is in the range: $\omega_b<\omega<\omega_c$) and field weakening region II, or "full field weakening region" (where speed ω is in the range: $\omega c<\omega$). Motor characteristics may be different in each region making it difficult to efficiently control a motor throughout such a range.

Figure 2D:
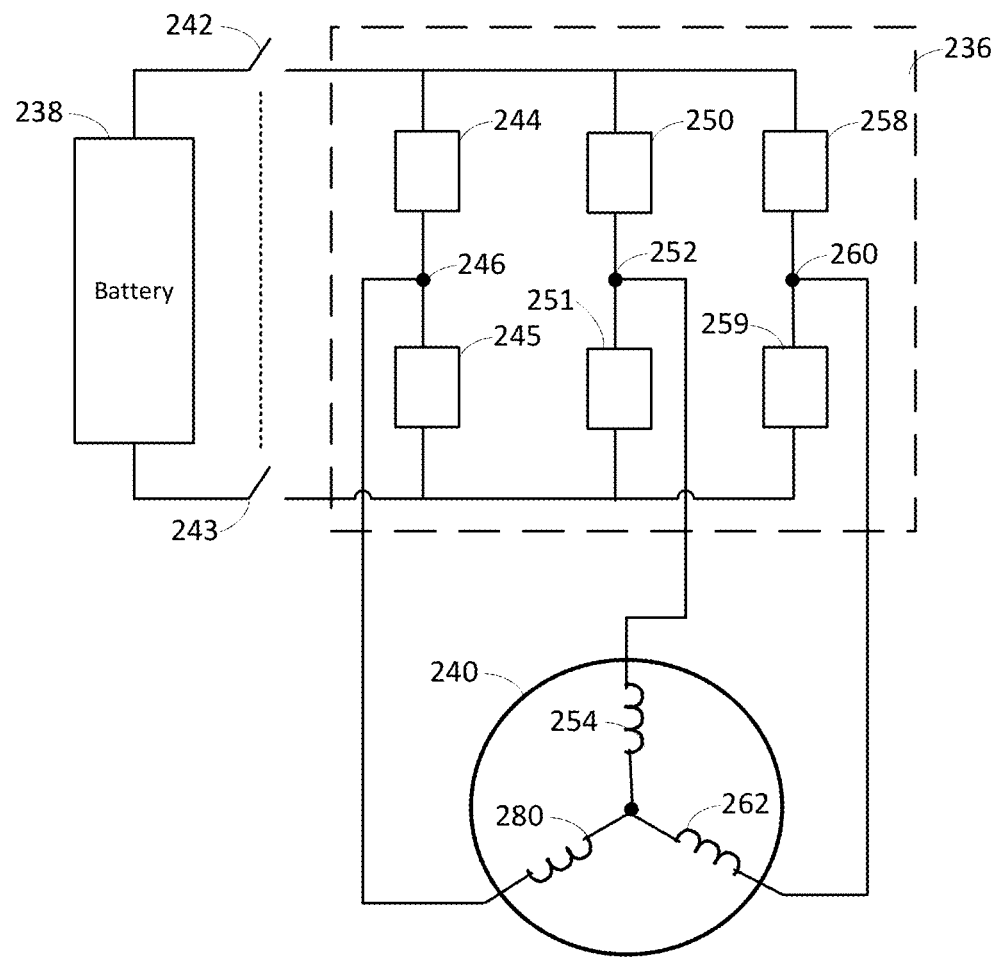
FIG. 2D illustrates an example of an MCU.

FIG. 2D shows a first example of an MCU 236 coupled between a battery 238 and a motor 240 (e.g. in an EV). A pair of switches 242, 243 couple battery 238 to MCU 236. Within MCU 236, switches 244, 245 are connected in series between terminals of battery 238, with terminal 246 between switches 244 and 245. Terminal 246 is coupled to a first winding 248 of motor 240. Switches 250, 251 are connected in series between terminals of battery 238, with terminal 252 between switches 250 and 251. Terminal 252 is coupled to a second winding 254 of motor 240. Switches 258, 259 are connected in series between terminals of battery 238, with terminal 260 between switches 258 and 259. Terminal 260 is coupled to a third winding 262 of motor 240. Switches 244, 245, 250, 251, 258, 259 may be formed in any suitable manner, for example using a transistor with a diode coupled between collector and emitter terminals. Such switches may be controlled to provide appropriate voltages to windings of motor 240 (e.g. by switching to convert a DC voltage from battery 238 into AC voltages provided to motor 240. Thus, MCU 236 functions as an inverter in this example and may also be referred to as inverter 236.

Figure 2E:
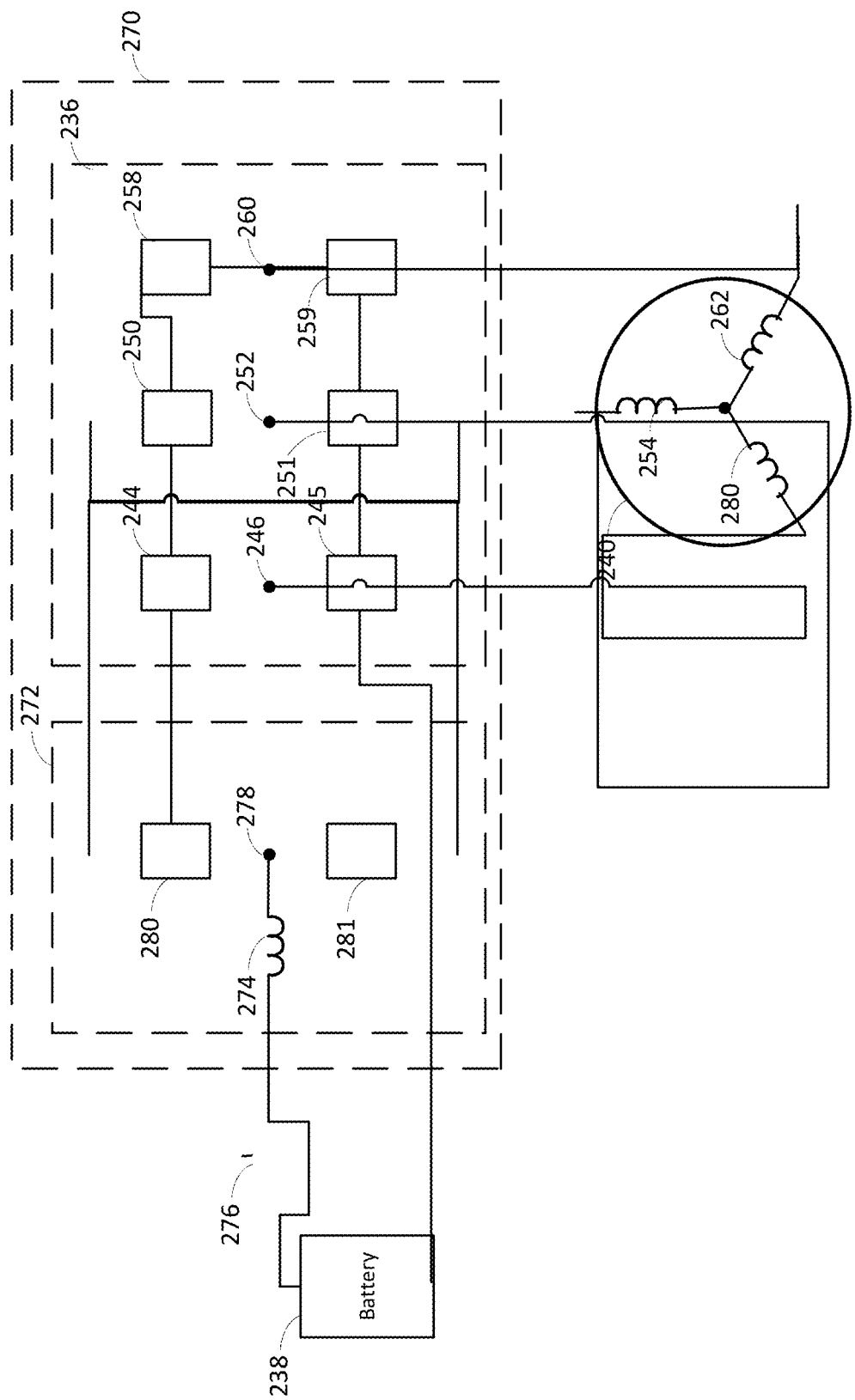
FIG. 2E illustrates another example of an MCU.

FIG. 2E shows another example of an MCU connected between battery 238 and motor 240. Similar components have similar reference numbering to FIG. 2D. In addition to inverter 236 shown in FIG. 2D, MCU 270 of FIG. 2E includes a boost converter 272 that receives a voltage from battery 238 and provides a boosted voltage to inverter 236. Boost converter 272 includes an inductor 274, which is connected to battery 238 through switch 276 at one end and is connected to node 278 at the other end. Node 278 is between switch 280 and switch 281, which are connected in series across input terminals of inverter 236 to provide a boosted output voltage to inverter 236. Switches 280, 281 and/or switches 244, 245, 250, 251, 258, 259 of inverter 236 may be formed in any suitable manner, for example using a transistor (e.g. MOSFET transistor) with a diode coupled between source and drain terminals.

Figure 3A:
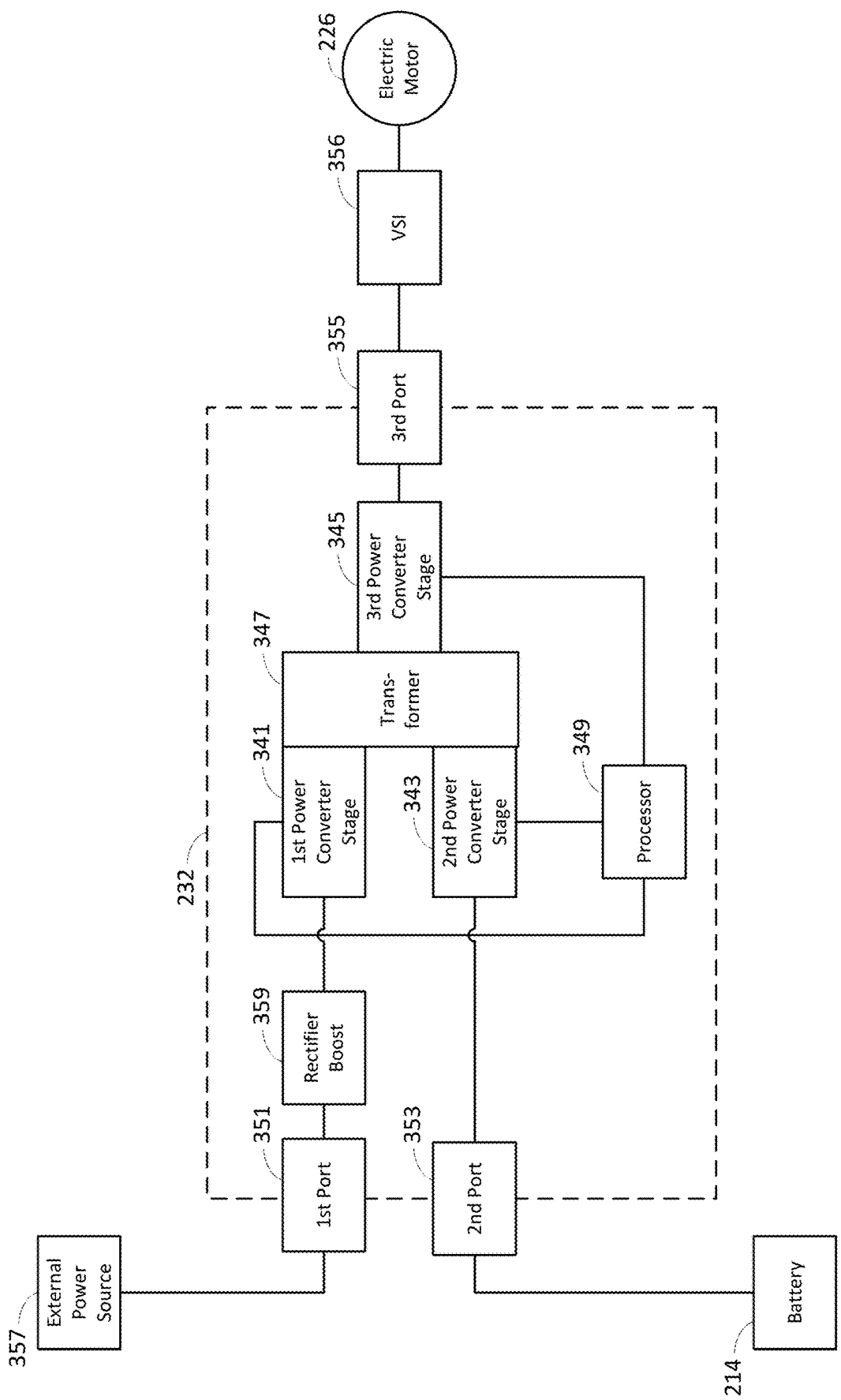
FIG. 3A illustrates an example of a combined OBC/MCU circuit in an EV.

FIG. 3A shows an example implementation of OBC/MCU circuit 232 as a three-port converter circuit that includes three power converter stages, first power converter stage 341, second power converter stage 343, and third power converter stage 345, coupled to transformer module 347. First power converter stage 341, second power converter stage 343, and third power converter stage 345 are coupled to processor 349, which controls components of the power converter stages, e.g. controls configuration of configurable power converter stages and controls frequency of switching of switchable components to manage power transferred by power converter stages. Each power converter stage is connected to a corresponding port of OBC/MCU circuit 232. First power converter stage 341 is connected to first port 351, second power converter stage 343 is connected to second port 353, and third power converter stage 345 is connected to third port 355.

While the ports of such a multi-port circuit may be coupled to a variety of components depending on the application, FIG. 3A shows an example that is suitable for use in an EV where first port 351 configured as an external power port and is connected to an external power source 357, e.g. charging station 212, domestic AC supply, or a generator (e.g. generator in HEV). In many cases, external power is provided as an AC current. A rectifier and boost circuit 359 is coupled between first port 351 and first power converter stage 341 to rectify such AC current and to boost the voltage provided to first power converter stage 341. In other examples, where a DC current is provided, rectifier and boost circuit 359 may be bypassed, or may be unnecessary. Second port 353 is configured as a battery port and is coupled to battery 214 (more than one battery may be provided in some examples). Third port 355 is configured as an electric motor port and is coupled through VSI 356 (Voltage Source Inverter) to electric motor 226 (more than one electric motor may be provided in some examples). In some examples, processor 349 may be coupled to additional components to receive inputs (e.g. to receive voltage measurement at first port 351 or second port 353) or to provide outputs (e.g. to control rectifier and boost circuit 359).

First, second, and third power converter stages 341, 343, 345 may be implemented using various circuits. Examples are provided here for illustration, but it will be understood that these are for example purposes and that power converter stages may be implemented in any suitable manner.

Figure 3B:
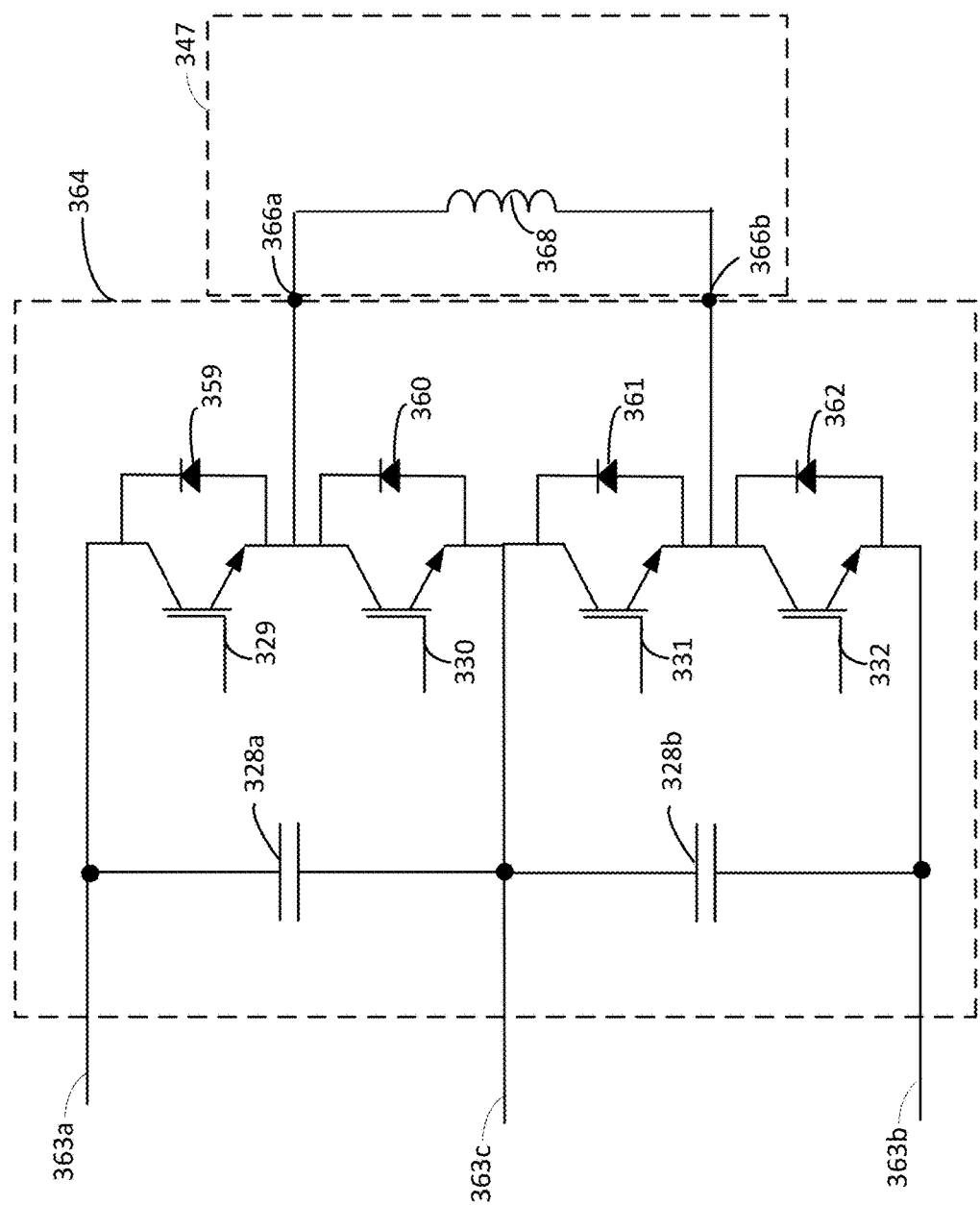
FIGS. 3B-E illustrate examples of power converter stages that may be used in a combined OBC/MCU circuit in an EV.

FIG. 3B shows an example of a power converter stage 364 implemented as a multi-level power converter stage (a three-level half-bridge phase-shift converter in this example). The circuit may be used to implement one or more of first, second, and third power converter stages 341, 343, 345 of OBC/MCU circuit 232 illustrated in FIG. 3A. Power converter stage 364 of FIG. 3B has capacitors 328a and 328b, which are connected in series between first terminals 363a and 363b of power converter stage 364. A middle terminal 363c is coupled between capacitors 328a and 328b for connection in some examples. When configured as first power converter stage 341, terminals 363a (positive), 363b (negative), and 363c (middle) may couple to a rectifier and boost circuit such as rectifier and boost circuit 359. In other cases, a DC input may be provided to terminals 363a, 363b (terminal 363c may be unused in this configuration). Such a DC input voltage is thus provided across the series combination of capacitor 328a and capacitor 328b. In one embodiment, capacitors 328a, 328b have the approximately same capacitance. Thus, during operation, half of the voltage (V1a) appears across each capacitor 328a, 328b, in one embodiment. Note that there may be some difference between the capacitance of capacitors 328a, 328b due to, for example, less than 100 percent precision in manufacturing. Hence, during operation, voltage might not be exactly evenly divided across the capacitors 328a, 328b.

Switches 329, 330, 331, and 332 are connected in series between the first terminals 363a, 363b, in this embodiment. The collector of switch 329 is connected to the positive first terminal 363a. The emitter of switch 329 is connected to the collector of switch 330. The emitter of switch 330 is connected to the collector of switch 331. The emitter of switch 331 is connected to the collector of switch 332. The emitter of switch 332 is connected to the negative first terminal 363b.

Each of the switches 329-332 has a diode connected in parallel. Switch 329 is connected in parallel with diode 358. Switch 330 is connected in parallel with diode 360. Switch 331 is connected in parallel with diode 361. Switch 332 is connected in parallel with diode 362.

The emitter of switch 329 and the collector of switch 330 are connected to second terminal 366a and emitter of switch 331 and the collector of switch 332 are connected to second terminal 366b. Second terminals 366a, 366b are connected to a transformer module such as transformer module 347. Specifically, second terminal 366a is connected to the positive polarity of the first winding 368 of a transformer, and second terminal 366b is connected to the negative polarity of the first winding 368 of the transformer. Transformer module 367 includes additional windings on the same or additional transformers to couple to another power conversion stage (e.g. another of first, second, and third power conversion stages 341, 343, 345). Some transformers may include three or more windings around a common core, and some transformer modules may include more than one transformer (e.g. two separate transformers, each with separate cores). While the example of FIG. 3B shows a three-level power converter stage, other multi-level power converter stages may have four or more levels.

Figure 3C:
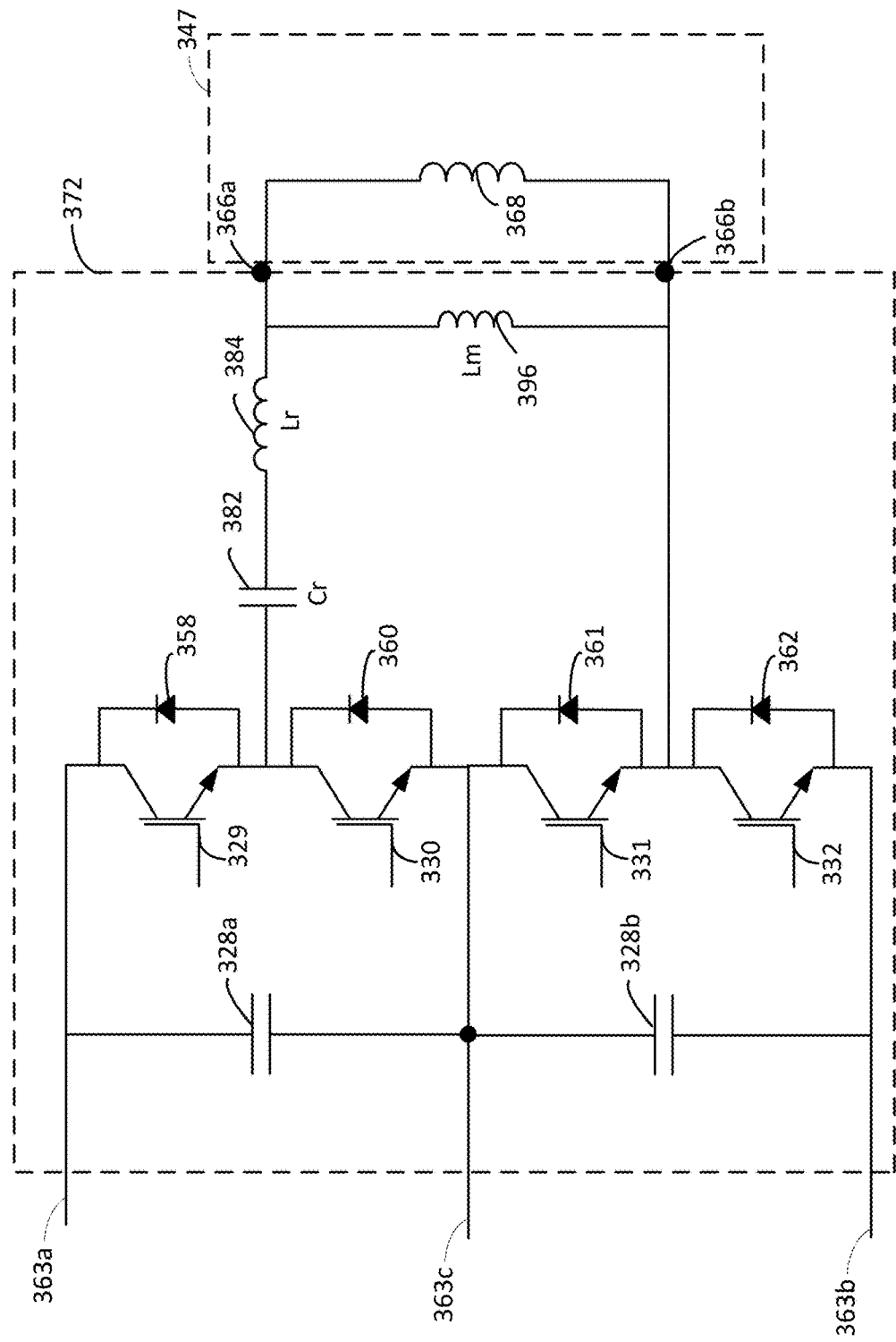

FIG. 3C depicts one embodiment of a power converter stage 372, which may be used to implement one or more of first, second, and third power converter stages 341, 343, 345 of OBC/MCU circuit 232 illustrated in FIG. 3A. This configuration may be referred to as a three-level half-bridge LLC converter. This configuration has some components in common with the configuration of FIG. 3B, which will not be described in detail again.

Power converter stage 372 has a resonant inductor ($L_r$) 384, excitation inductor ($L_m$) 396, and resonant capacitor ($C_r$) 382. Note that these circuit elements represent the resonant inductance, excitation inductance and resonant capacitance in an LLC series resonant converter. In one embodiment, the LLC series resonant converter is operated near the resonant frequency, which is very efficient. In one embodiment, zero-voltage switching (ZVS) is retained by operating near the resonant frequency. ZVS is one example of a soft switching technique. Soft switching techniques may improve power efficiency by reducing switching losses.

The emitter of switch 329 and the collector of switch 330 are connected to the series combination of resonant inductor ($L_r$) 384 and resonant capacitor ($C_r$) 382. The series combination of resonant inductor ($L_r$) 384 and resonant capacitor ($C_r$) 382 are connected to second terminal 366a, and the emitter of switch 331 and the collector of switch 332 are connected to second terminal 366b. The excitation inductor ($L_m$) 396 is connected between second terminals 366a and 366b.

Figure 3D:
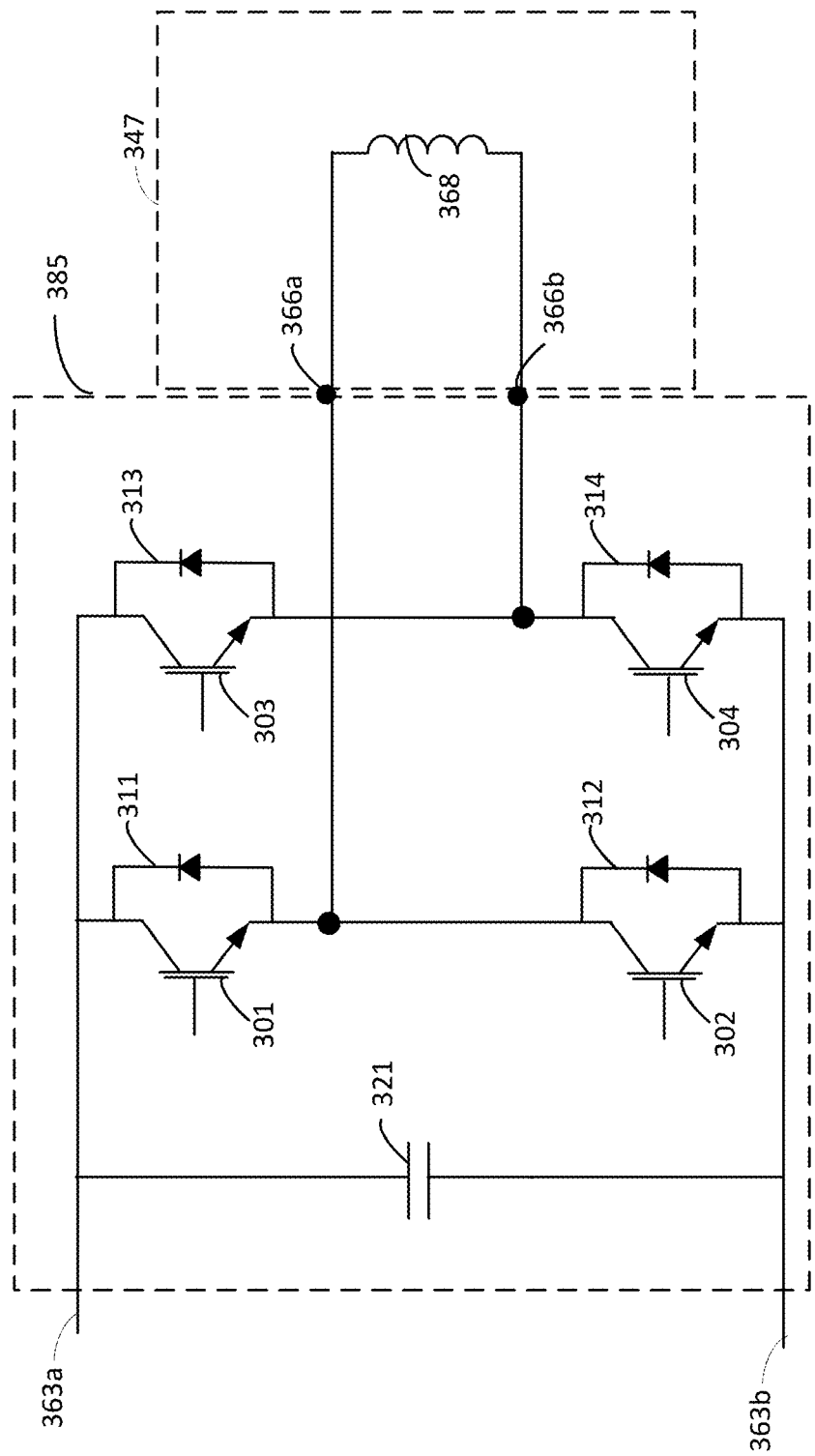

FIG. 3D depicts one embodiment of a power converter stage 385, which may be used to implement one or more of first, second, and third power converter stages 341, 343, 345 of OBC/MCU circuit 232 illustrated in FIG. 3A. The configuration in FIG. 3D may be referred to as an H-bridge or two-level full-bridge phase-shift converter and may be used as a rectifier (e.g. rectifying an AC voltage from transformer module 347 coupled to second terminals 366a, 366b to provide DC power at first terminals 363a, 363b.

Power converter stage 385 has switch 301, which is in parallel with diode 311; switch 302, which is in parallel with diode 312; switch 303, which is in parallel with diode 313; and switch 304, which is in parallel with diode 314. The power converter stage 385 has a capacitor 321, which is connected between first terminals 363a, 363b. Switches 301 and 302 are connected in series across the input, in this embodiment. Likewise, switches 303 and 304 are connected in series between the second terminals 366a, 366b, in this embodiment. The emitter of switch 301 and the collector of switch 302 are connected to second terminal 366a and the emitter of switch 303 and the collector of switch 304 are connected to second terminal 366b. Second terminal 366a is connected to the positive polarity of first winding 368, and second terminal 366b is connected to the negative polarity of second winding 369 of transformer module 347.

Examples of the present technology may use one or more of power converter stages 364, 372, and 385, or similar power converter stages in a circuit with three power converter stages coupled to a common transformer module as illustrated in FIG. 3A. Thus, first power converter stage 341, second power converter stage 343, and third power converter stage 345, may each be implemented by power converter stages 364, 372, and/or 385. Transformer module 347 may be implemented by one transformer (e.g. having three windings wound on a common core, each winding coupled to a corresponding power converter stage) or by more than one transformer (e.g. two transformers, each with two windings, each winding coupled to a power converter stage, with one power converter stage coupled to windings of two transformers). Such arrangements may provide wide flexibility in voltage conversion while maintaining high efficiency.

Figure 3E:
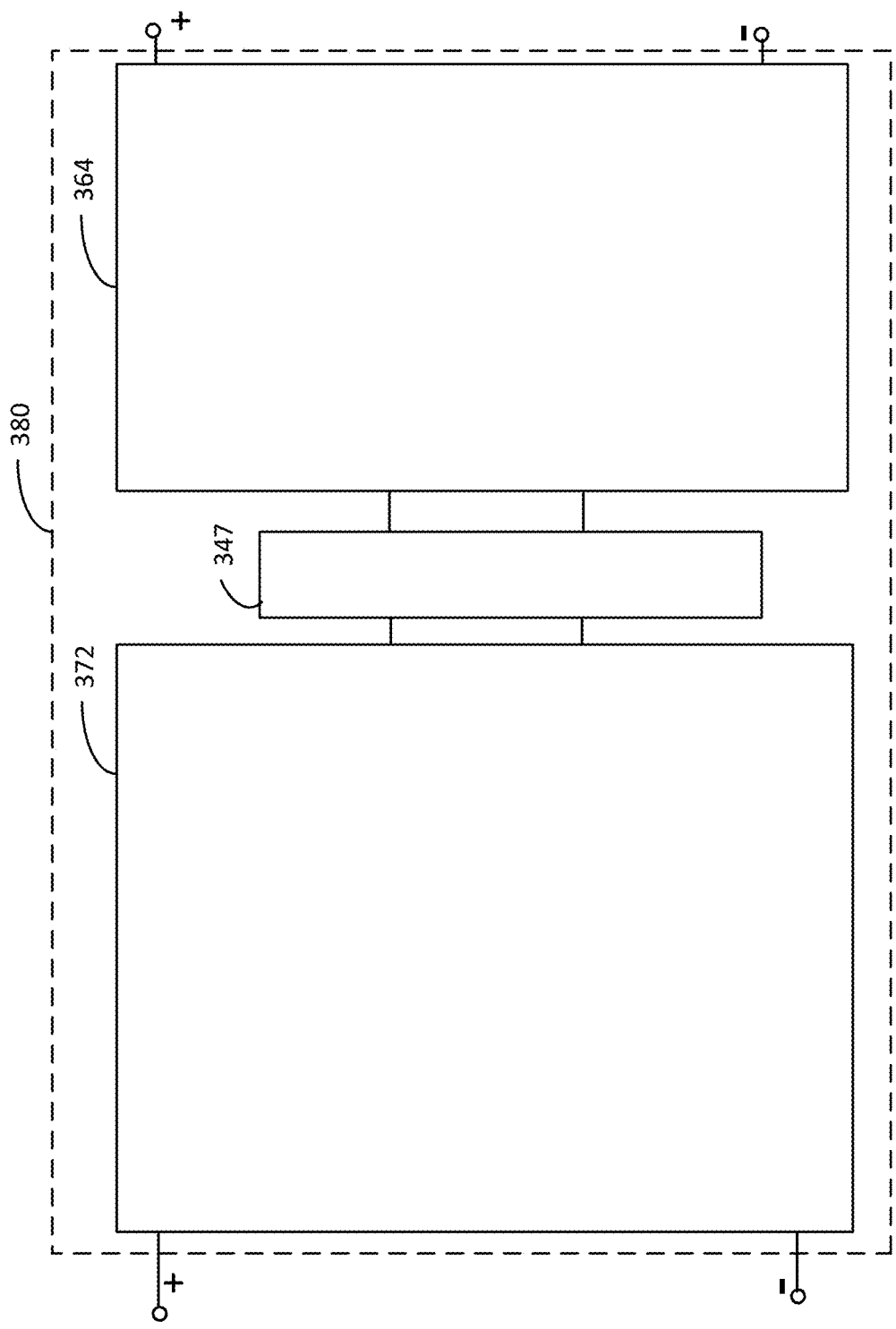

FIG. 3E illustrates an implementation of a portion of OBC/MCU circuit 232, showing a three-level half-bridge LLC converter (power converter stage 372 of FIG. 3C) and three-level half-bridge phase-shift converter (power converter stage 364 shown in FIG. 3B) coupled through transformer module 347 to form a resonant converter 380 (three-level switching bridge DC-DC converter). This may correspond to first power converter stage 341 coupled to second power converter stage 343 or third power converter stage 345, or to second power converter stage 343 coupled to third power converter stage 345. In this arrangement, where power converter stage 372 is configured as first power converter stage 341, it may receive power from an external source as DC current (e.g. passed through rectifier and boost circuit 359). Power converter stage 372 inverts the DC current to generate an AC current. This conversion may include generating the AC current at different levels depending on the configuration of first power converter stage 341. AC current is supplied to transformer module 347 which is coupled to power converter stage 364. Transformed AC current provided to power converter stage 364 may be rectified to DC current at different levels depending on the configuration of power converter stage 364.

It can be seen that power is transferred through transformer module 347 in this arrangement, which provides isolation between both sides of resonant converter 380. First power converter stage 341, second power converter stage 343, and third power converter stage 345 of FIG. 3A are coupled through transformer module 347 (through one or more transformers) so that isolation is provided between ports (i.e. between any two of first port 351, second port 353, and third port 355). While isolation is not required for MCUs (i.e. between a battery and an electric motor), galvanic isolation is mandatory for OBC according to certain standards (e.g. SAE & UL standards). Isolation typically drives cost higher. A three-port coupled HF-link isolated DC-DC converter may reduce bridge cost and provide galvanic isolation.

Another issue is that battery voltage and DC output voltage may have wide ranges, which may cause converter efficiency to be lower than desired (e.g. operating a resonant converter at a frequency far from its resonant frequency). Using multi-level switching bridges (e.g. 3-level switching bridges) for both high voltage and low voltage sides of a resonant converter may allow such a converter to operate efficiently over a wide range of voltage. In some cases Silicon Carbide (SiC) devices may be used for the power converter stages (HF bridges) for higher efficiency and smaller dimension and weight.

Power converter stage 372 includes inductive elements $L_r$, $L_m$ and capacitor Cr1 so that the combination of power converter stage 372, power converter stage 364, and transformer T1 forms a resonant converter (an LLC converter in this example) which has a resonant frequency. In general, such resonant converters, including LLC converters, are efficient at frequencies at or near their resonant frequency and are inefficient at other frequencies. While modifying frequency may allow conversion of a range of voltages, deviation from resonant frequency may result in lowered efficiency. Configurable power converter stages accommodate a wide range of voltages without changing frequency (or with relatively small changes to frequency) so that a wide range of voltages can be accommodated while maintaining high efficiency. Thus, the circuit of FIG. 3E may provide high efficiency when converting power over a wide range of supply voltages (e.g. power from different charging stations, AC power in different parts of the world, different generators, solar panels, and other sources of power) and/or over a wide range of output voltages (e.g. to different batteries and/or different battery conditions). Such a power converter circuit implemented between a battery and a motor may also accommodate a wide range of voltages (e.g. according to battery condition and/or changing requirements of a motor depending on driving conditions).

Figure 4A:
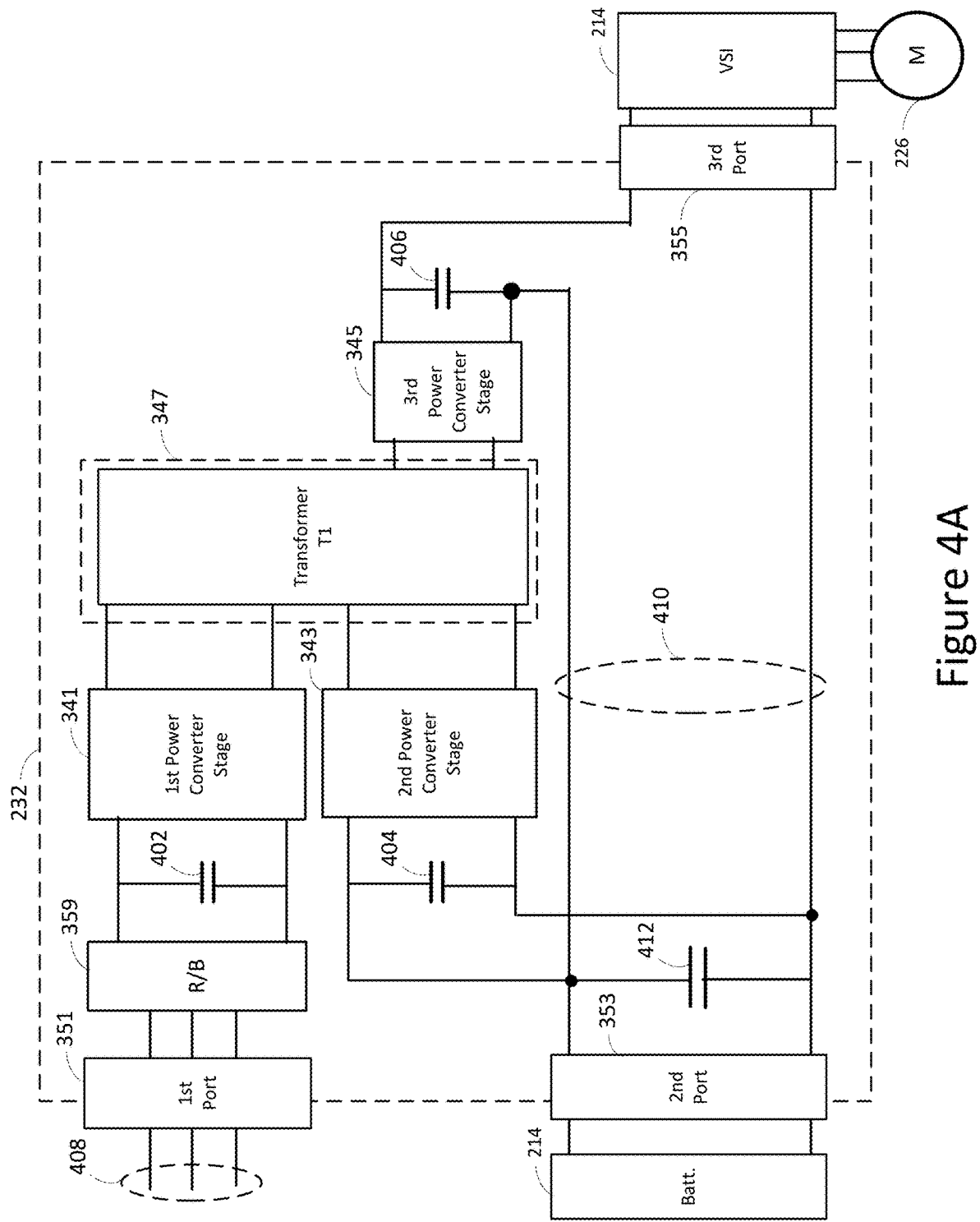
FIGS. 4A-D illustrate different transformer module configurations that may be used in a combined OBC/MCU circuit in an EV.

FIG. 4A illustrates an embodiment of OBC/MCU circuit 232 as a three-port converter circuit that includes three power converter stages, first power converter stage 341, second power converter stage 343, and third power converter stage 345 coupled to first, second, and third ports 351, 353, and 355 as previously illustrated in the example of FIG. 3A. Transformer module 347 is implemented as a single transformer T1 in this example. First power converter stage 341, second power converter stage 343, and third power converter stage 345 are coupled to transformer T1 of transformer module 347. First power converter stage 341, second power converter stage 343, and third power converter stage 345 have respective capacitors 402, 404, 406 connected across terminals not coupled to transformer T1. Processor 349, which controls components of the power converter stages is omitted for clarity of illustration. A coupling 408 (e.g. power cable) connects first port 351 to an external power source (power is provided as three phase AC power in this example). Second port 353 is configured as a battery port and is connected to battery 214 (e.g. high voltage battery). Third port 355 is configured as an electric motor port and is connected to electric motor 226 through a Voltage Source Inverter (VSI).

Any of the power converter stages may be implemented as multi-level power converter stages. For example, first power converter stage 341 and second power converter stage 343 may be implemented using 3-level switching bridges, thus forming a power converter (e.g. a resonant converter as illustrated in FIG. 3E) between coupling 408 (to external power) and battery 214. The benefits include wide voltage regulation capability in both charging mode and invert mode, which leads to higher converter efficiency and lower cost. Third power converter stage may be implemented using an H-bridge as a rectifier (e.g. using power converter stage 385 illustrated in FIG. 3D).

On the AC input side, rectifier and boost circuit 359 may be implemented using a 3-level active switching PFC circuit to supply a voltage that can be regulated within a very wide range, e.g., 400V to 800 Vdc for battery 214 and DC bus 410 (which includes capacitor 412. Wide DC bus voltage can be used to adjust the output voltage thus allowing operation near the resonant frequency for high efficiency. Rectifier and boost circuit 359 may be implemented as a three-level PFC circuit including NPC rectifier, Vienna rectifier, flying-capacitor rectifier, or other suitable circuit. PFC control may be implemented by sensing AC voltage and AC current (e.g. at first port 351) and real-time dynamically shaping the total AC input current waveform by using active switching bridges (e.g. AC voltage and current data provided to processor 349, which controls switching of active switches of first power converter stage 341, second power converter stage 343, and third power converter stage 345 according to the data).

Second port 353 is coupled to third port 355 through second power converter stage 343, transformer T1 of transformer module 347, and third power converter stage 345. Second port 353 is also coupled to third port 355 through DC bus 410, which connects second port 353 (battery port) in series with third power converter stage 345. Thus, when battery 214 supplies power to electric motor 226, the voltage provided to third port 355 (electric motor port) is the sum of the voltage output directly from battery 214 (via DC bus 410) plus the voltage output by third power converter stage 345, which may be controlled to supply the total voltage according to requirements (e.g. adjusting to motor operating conditions). Thus, for example, when back-EMF of electric motor 226 increases at high speed, voltage at third port 355 may be increased or boosted using the combination of second power converter stage 343, transformer T1, and third power converter stage 345, which may form a resonant converter (e.g. as shown in FIG. 3E). Efficient transfer of power is achieved by providing a direct path through DC bus 410 with an additional controllable path through first and second power converter stages, which may be multi-level power stages that allow adjustment of voltage through reconfiguration of power converter stages so that conversion may occur at or near the resonant frequency. In some examples, first and second power converter stages 341, 343 are implemented as illustrated in FIG. 3E, while third power converter stage 345 is implemented as illustrated in FIG. 3D (e.g. as an H-bridge such or two-level full-bridge phase-shift converter).

Figure 4C:
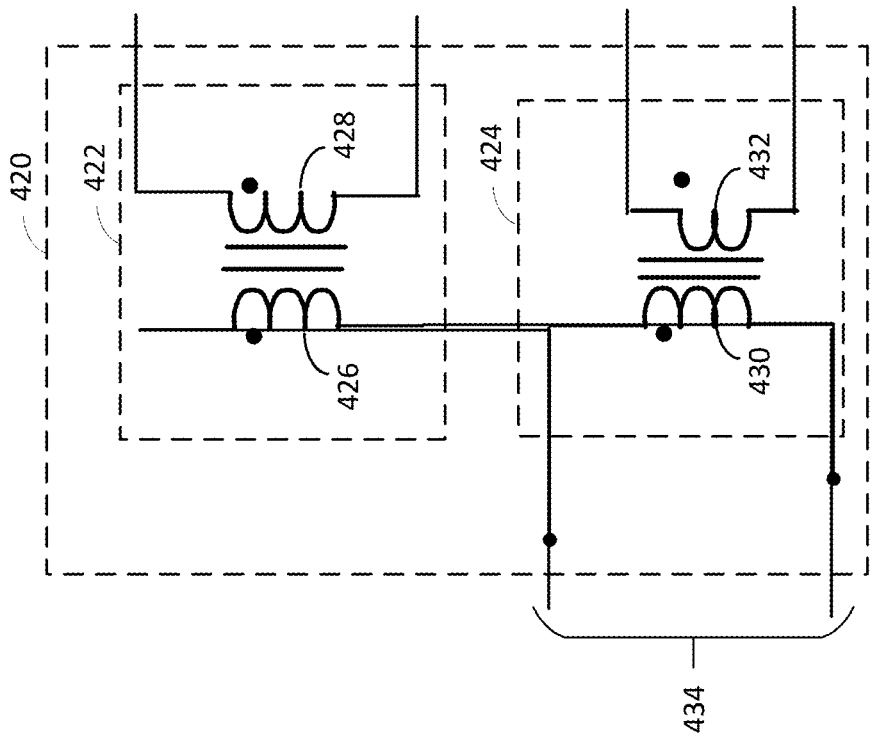
Figure 4B:
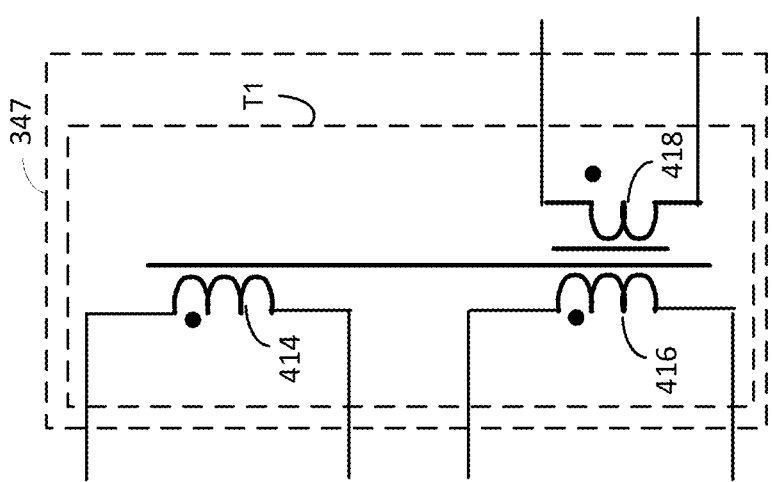

FIG. 4B shows a more detailed illustration of transformer T1 of transformer module 347 including first winding 414 (coupled to first power converter stage 341 in FIG. 4A) second winding 416 (coupled to second power converter stage 343 in FIG. 4A) and third winding 418 (coupled to third power converter stage 345 in FIG. 4A) of transformer T1 (i.e. first, second, and third windings 414, 416, 418 are wound on a common core).

While the examples of FIG. 4B shows transformer module 347 formed of a single transformer (transformer T1), in some examples a transformer module may be implemented by two or more transformers that couple power converter stages. FIG. 4C illustrates an example in which a transformer module 420 is implemented using a first transformer 422 and a second transformer 424. First transformer 422 includes first winding 426 and second winding 428 that are wound on a common core. Second transformer 424 includes first winding 430 and second winding 432 that are wound on a different core. First windings 426, 430 are connected in parallel to provide combined terminals 434 so that transformer module 420 has three pairs of terminals similarly to transformer module 347.

Figure 4D:
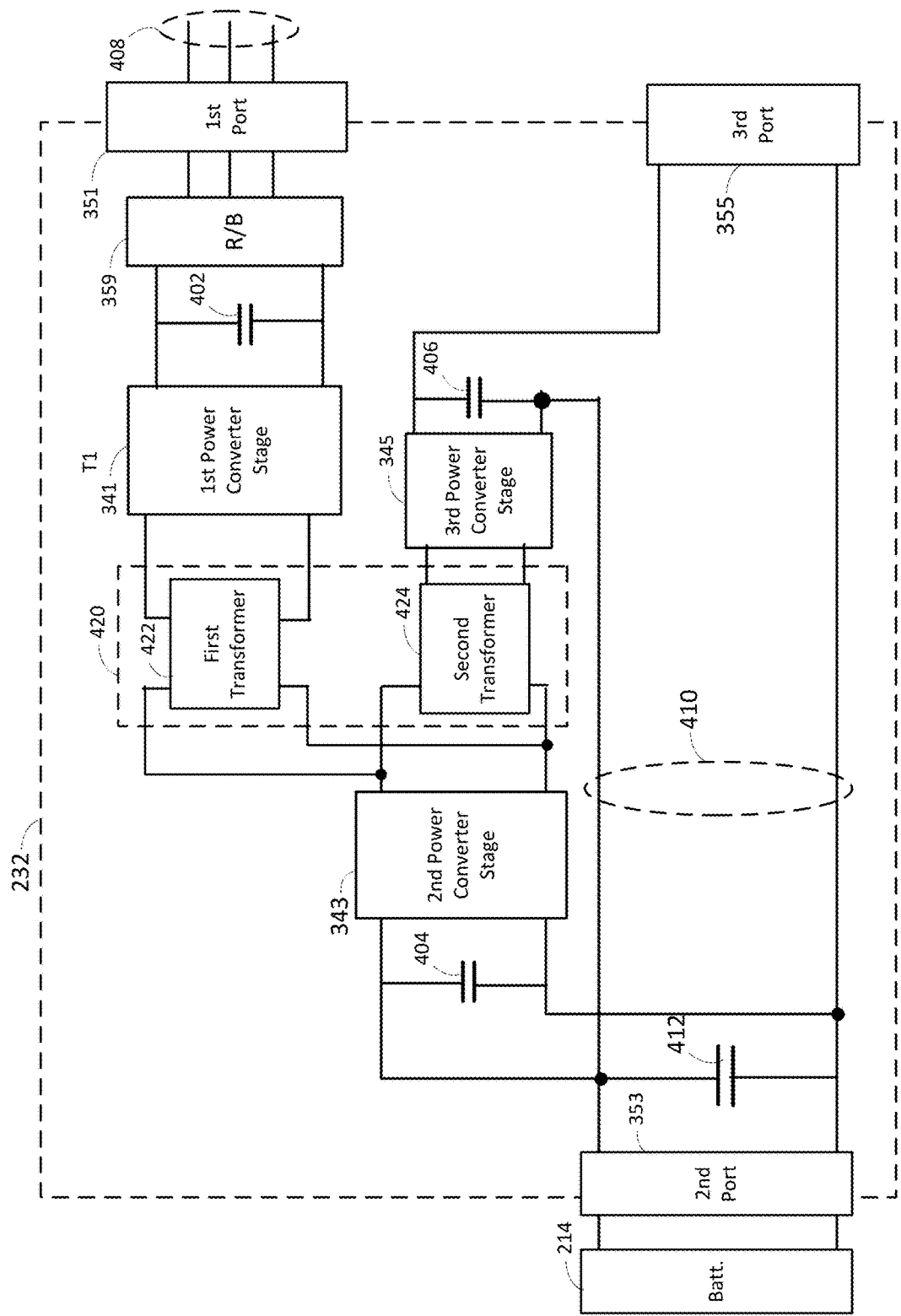

FIG. 4D illustrates an example of OBC/MCU circuit 232 implemented using transformer module 420 instead of transformer module 347 as previously illustrated in FIG. 4A. Components that are common to FIG. 4A are numbered accordingly and are not further described here. First transformer 422 is connected between first power converter stage 341 and second power converter stage 343. Second transformer 424 is coupled between second power converter stage 343 and third power converter stage 345. It will be understood that different transformer module configurations, other than those illustrated in FIGS. 4A-D may be used to implement aspects of the present technology.

Figure 5:
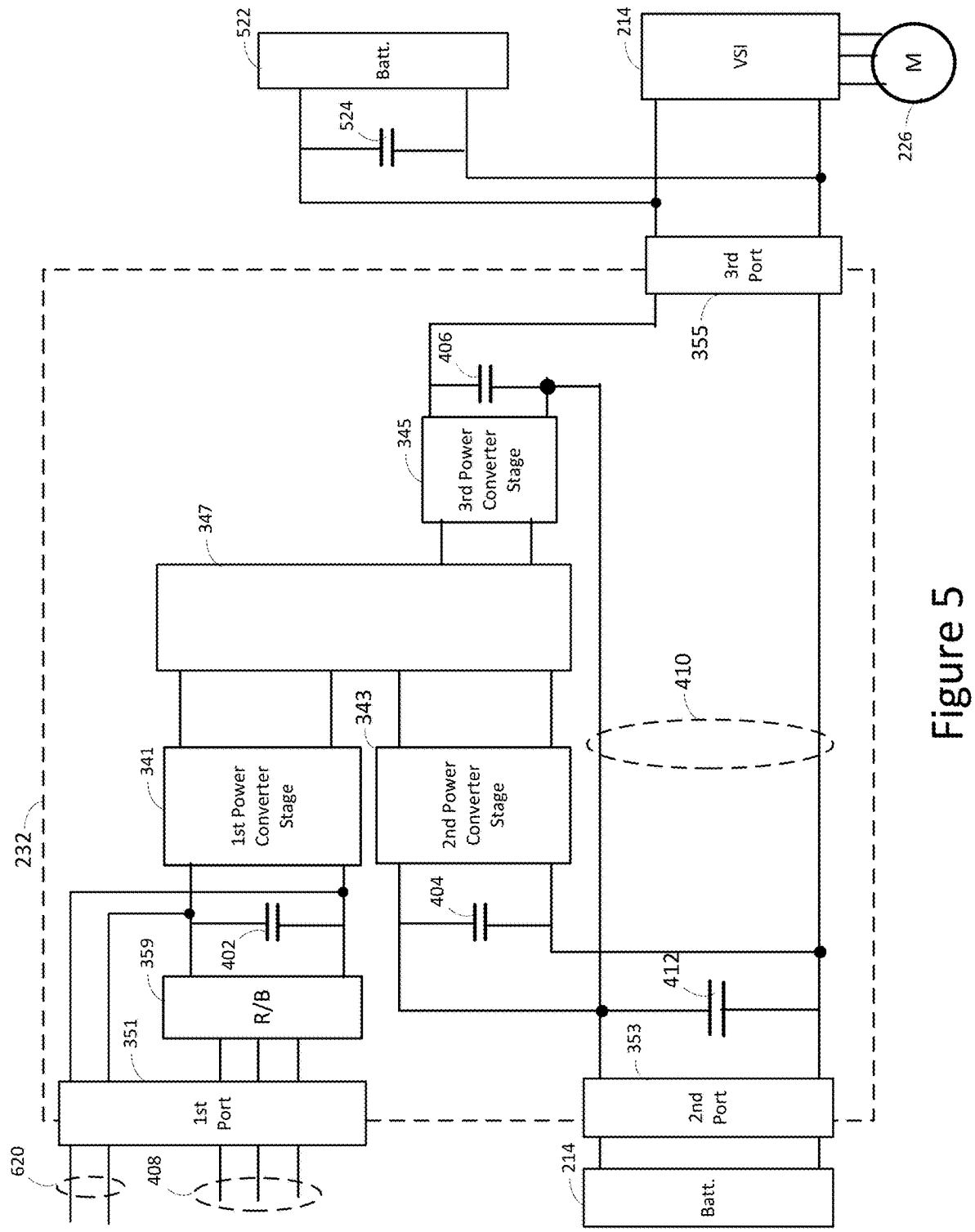
FIG. 5 illustrates components of an EV including two batteries, AC and DC charging.

FIG. 5 illustrates an alternative embodiment that shows OBC/MCU circuit 232 of FIG. 4 with additional components that may be used in some cases. In addition to coupling 408, which provides three phase AC, coupling 620 is shown coupled to first port 351 to allow power to be supplied as DC instead of AC (e.g. from a charging station). DC power may bypass rectifier and boost circuit 359 so that coupling 620 may be directly coupled to first power converter stage 341. This allows OBC/MCU circuit 232 to accept external power as either AC or DC, thus providing a wide range of charging options. It will be understood that power may be provided as single phase AC power or other format also.

FIG. 5 also shows battery 522 and capacitor 524 connected to third port 355 (this is in addition to battery 214). Battery 522 may be a high voltage battery that provides a higher voltage than battery 214. Thus, the sum of voltages from DC bus 410 (directly provided by battery 214) and from third power converter stage 345 may be approximately equal to voltage from battery 522. Battery 522 may be charged through third port 355, which may thus serve as both an electric motor port and a battery port in this configuration.

Aspects of the present technology are not limited to any single type of electric motor and may be used with different electric motor designs including single winding motors (e.g. as shown in FIGS. 4-5), dual winding motors and open winding motors and with any number of motors (either the same type or different types).

Figure 6:
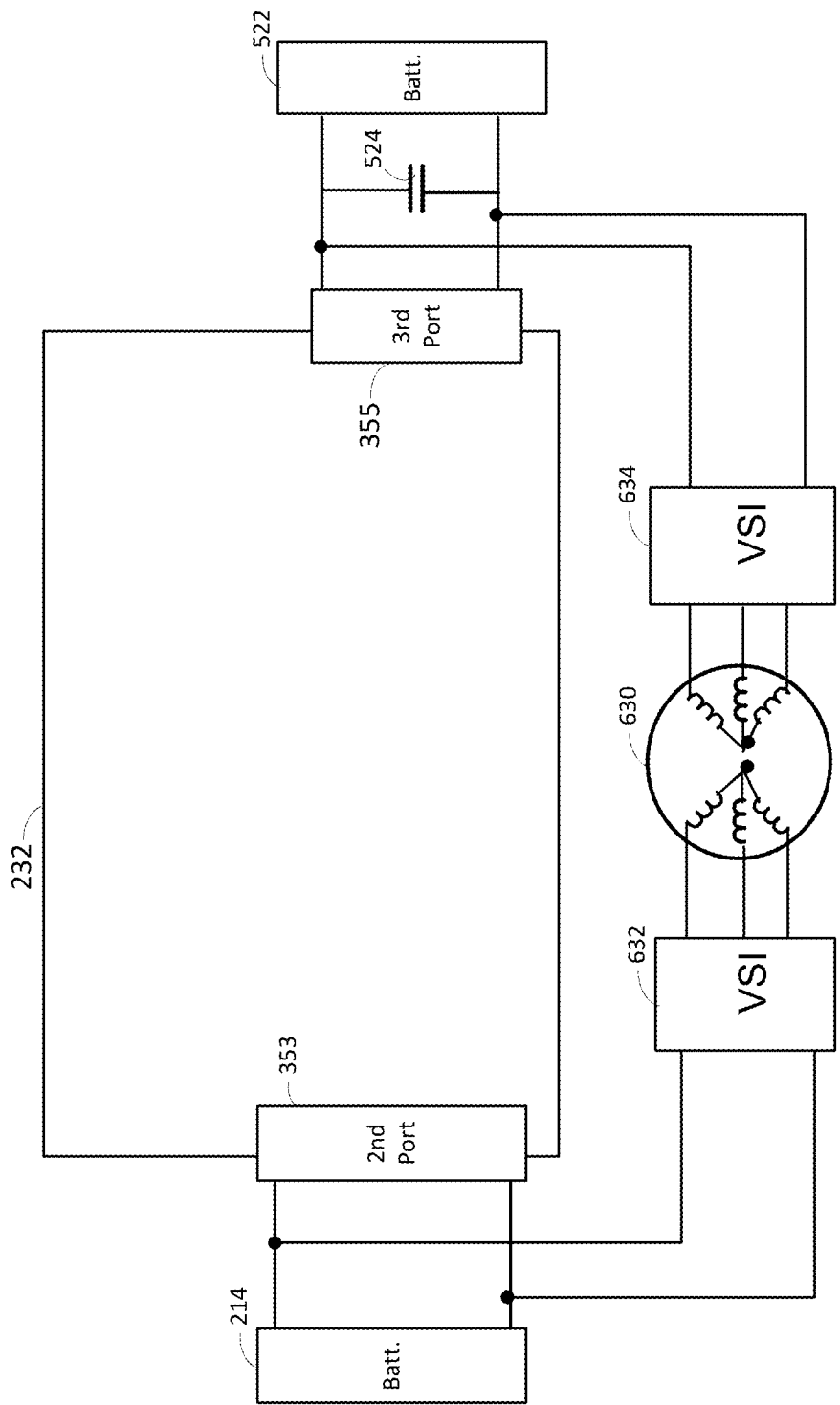
FIG. 6 illustrates an example of a combined OBC/MCU circuit coupled to a dual winding motor.

FIG. 6 illustrates an example where OBC/MCU circuit 232 is used with a dual winding motor 630. Details of OBC/MCU circuit 232 are omitted from this illustration for simplicity (see FIG. 5 for example details). In FIG. 6, second port 353 is connected to a first VSI 632, which is connected to first windings of dual winding motor 630. Thus, first VSI 632 is connected directly to battery 214 in this configuration. Third port 355 is connected to a second VSI, which is connected to second windings of dual winding motor 630. Second VSI 634 is connected to battery 522 in this configuration. Thus, each winding is supplied through a different VSI connected to a different port. Second battery 522 may be considered optional in this arrangement since second VSI 634 can be powered from battery 241 through third port 355.

Figure 7A:
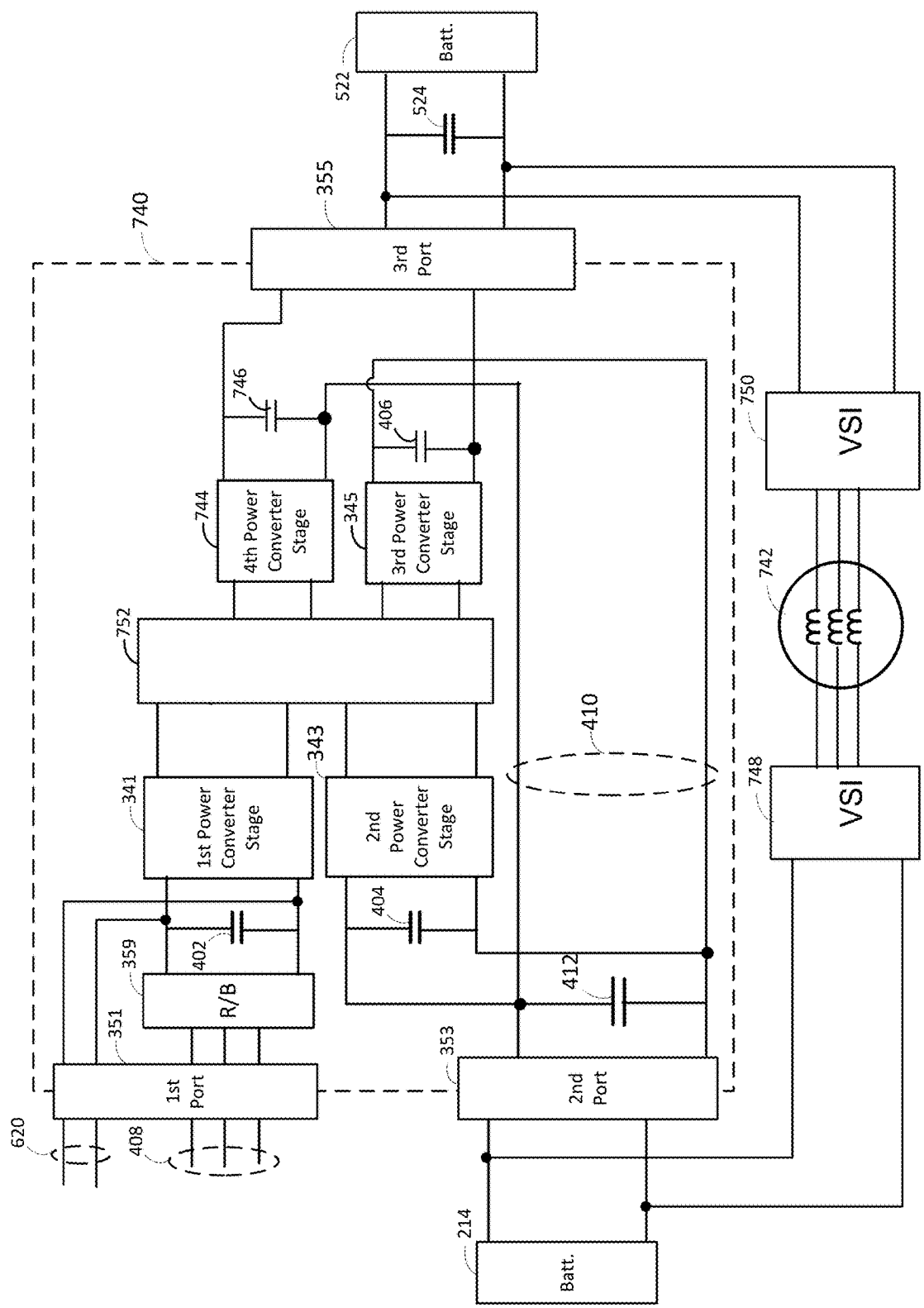
FIGS. 7A-B illustrate an example of a combined OBC/MCU circuit that includes four power converter stages.

FIG. 7A illustrates an example of an OBC/MCU circuit 740 used with an open winding motor 742. OBC/MCU circuit 740 includes components that are similar to those of OBC/MCU circuit 232 as illustrated in FIGS. 4 and 5, which are similarly numbered and are not further described here. In addition to the first power converter stage 341, second power converter stage 343, and third power converter stage 345, FIG. 7 shows fourth power converter stage 744 and capacitor 746 coupled between transformer module 752 and third port 355. Fourth power converter stage 744 may be an H-bridge such as power converter stage 385 of FIG. 3D (e.g. two-level full-bridge phase-shift converter). A first VSI 748 is coupled to second port 353 to provide power to one side of open winding motor 742 while a second VSI 750 is coupled to third port 355 to provide power to another side of open winding motor 742.

Figure 7B:
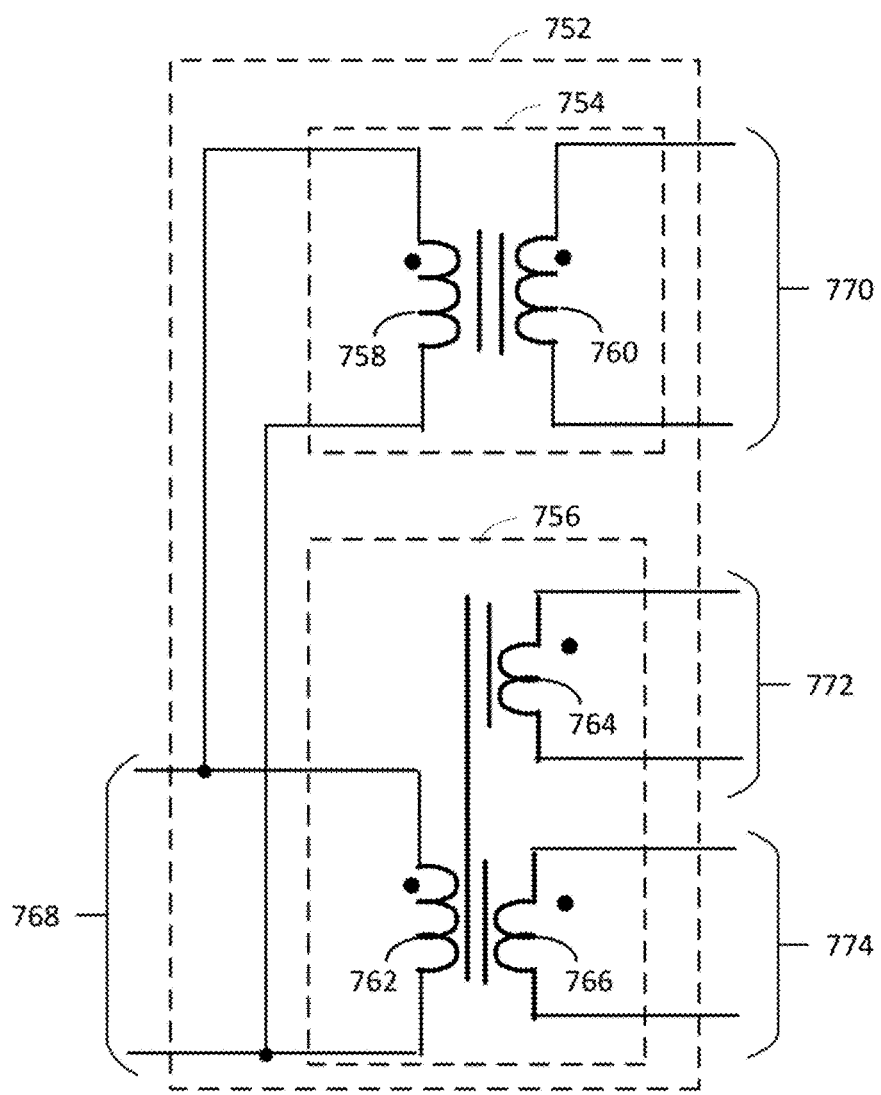

FIG. 7B shows an example of how a transformer module, such as transformer module 752, may be implemented using two transformers, a first transformer 754 and a second transformer 756. First transformer 754 includes first winding 758 and second winding 760 that are wound on a common core. Second transformer 756 includes first winding 762, second winding 764, and third winding 766 that are wound on a different core. First windings 758, 762 are connected in parallel to provide combined terminals 768 (e.g. for connection to second power converter stage 343). Second winding 760 of first transformer 754 is coupled to terminals 770 (e.g. for connection to first power converter stage 341). Second winding 764 of second transformer 756 is coupled to terminals 772 (e.g. for connection to fourth power converter stage 744) and third winding 766 of second transformer 756 is coupled to terminals 774 (e.g. for connection to third power converter stage 345)

Rectifier and boost circuit 359 may be implemented in different configurations. For example, different configurations may be used depending on the external power source used and/or configuration of first power converter stage 341. Where an external power source provides DC power, no rectifier and boost circuit may be needed and DC power may be provided directly to a first power converter stage (e.g. to first power converter stage 341). While examples of rectifier and boost circuits suitable for implementing rectifier and boost circuit 359 are provided here, AC power may be rectified and boosted using any appropriate circuit.

Figure 8:
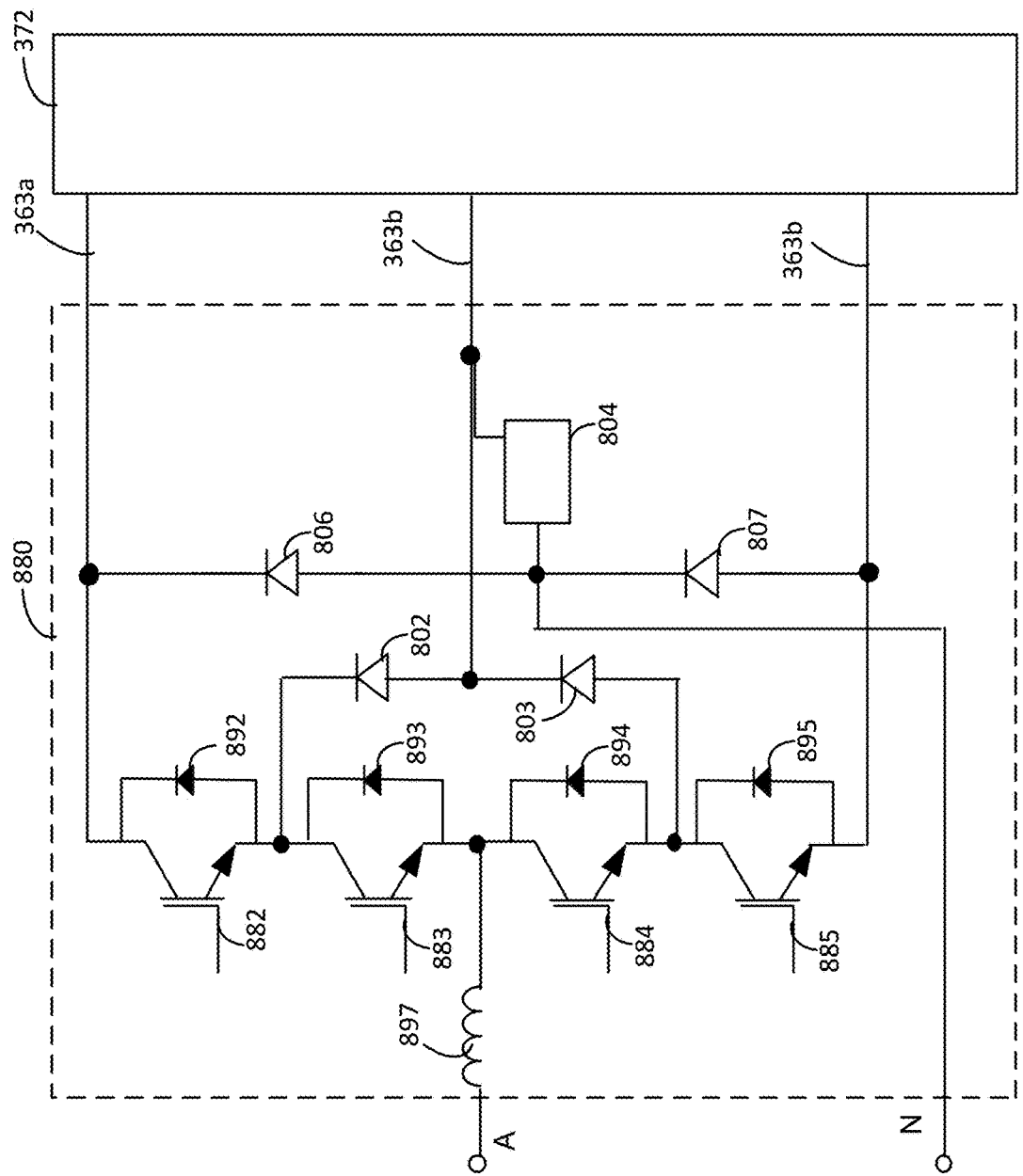
FIG. 8 illustrates an example of a rectifier and boost circuit coupled to a power converter stage.

FIG. 8 shows an example of a rectifier and boost circuit 880 that is coupled to terminals 363a, 363b, 363c of power converter stage 372 (illustrated in FIG. 3C). Rectifier and boost circuit 880 may correspond to rectifier and boost circuit 359 and power converter stage 372 may correspond to first power converter stage 341 in OBC/MCU circuit 232 (as illustrated in FIG. 3A).

Rectifier and boost circuit 880 is a Neutral Point Clamped (NPC) PFC circuit configured to receive a single-phase AC input across terminal A and terminal N (active and neutral terminals respectively) and generate a DC output to power converter stage 372. Four switches 882, 883, 884, 885 are connected in series as shown, with diodes 892, 893, 894, 895 connected across their respective collector and emitter terminals. Input from terminal A is provided through inductor 897 between switch 883 and switch 884. Diodes 802, 803 are connected in series across switches 883, 884 as shown with terminal 363c connected between diodes 802, 803. Diodes 806, 807 are coupled between terminals 366a, 366b and terminal N is connected between diodes 806, 807. Terminal N is also connected through AC relay 804 to terminal 363b.

Figure 9A:
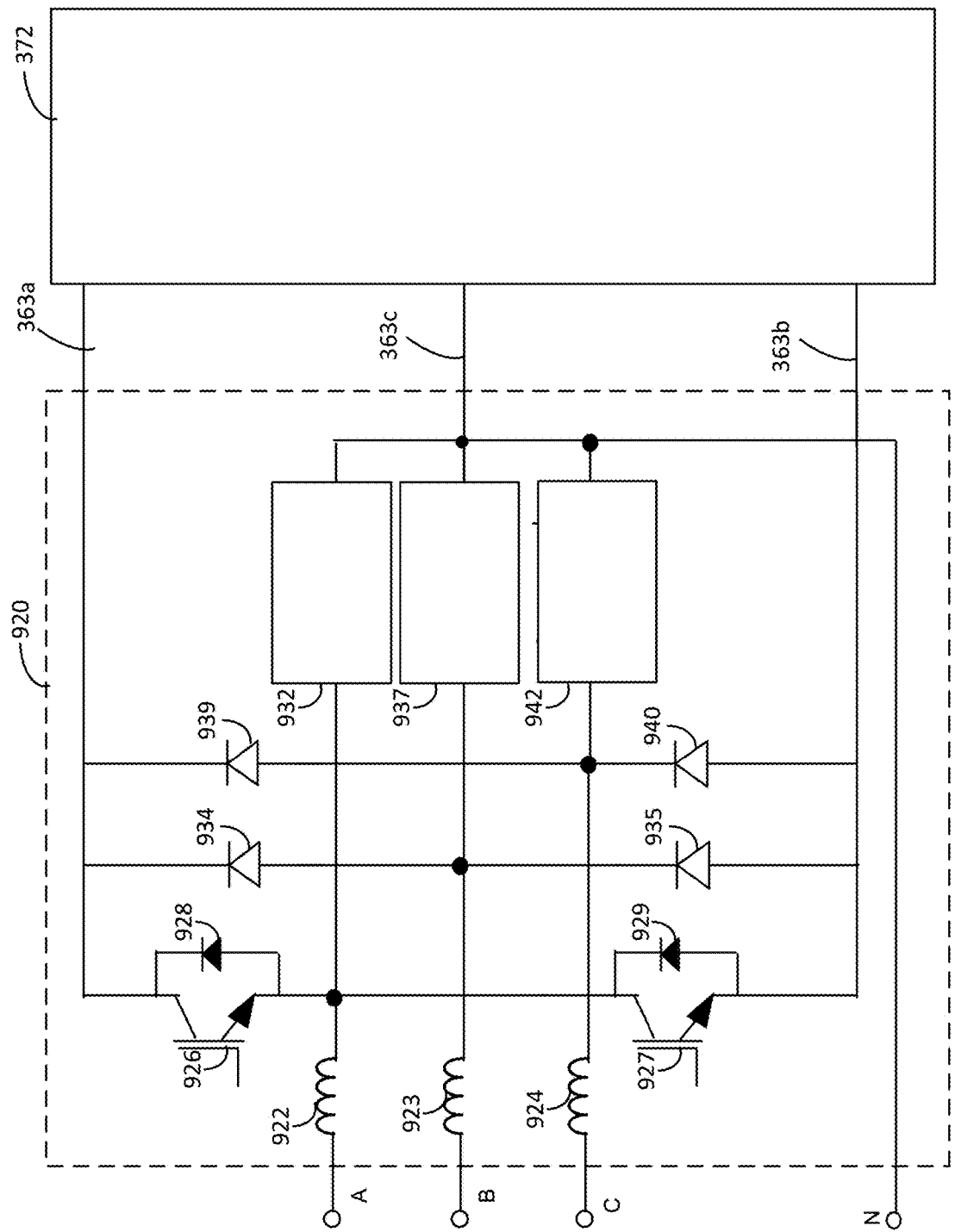
FIGS. 9A-B illustrate another example of a rectifier and boost circuit coupled to a power converter stage.

FIG. 9A shows an example of a rectifier and boost circuit 920 coupled to terminals 363a, 363b, 363c of power converter stage 372 (illustrated in FIG. 3C). Rectifier and boost circuit 920 may correspond to rectifier and boost circuit 359 and power converter stage 372 may correspond to first power converter stage 341 in OBC/MCU circuit 232 (as illustrated in FIG. 3A).

Rectifier and boost circuit 920 is a Vienna 3-level boost PFC configured to receive three phase AC power on terminals A, B, C, and N and provide a DC output to power converter stage 372. Rectifier and boost circuit 920 uses Pulse Width Modulation (PWM) to rectify an AC input to generate a DC voltage (e.g. under control of processor 349). Terminals A, B, C (active terminals with different phase components of three phase AC input) are coupled through inductors 922, 923, 924 respectively. Inductor 922 is connected to switches 926, 927, which have diodes 928, 929 connected across their respective collector and emitter terminals as shown. Switches 926, 927 are also coupled to terminals 363a, 363b of power converter stage 372. Inductor 922 is also connected to a first switching structure 932, which may contain active switching components to implement PWM rectification. Inductor 923 is connected to diodes 934, 935, which extend between terminals 363a, 363b as shown. Inductor 923 is also connected to second switching structure 937. Inductor 924 is connected to diodes 939, 940, which extend between terminals 363a, 363b as shown. Inductor 924 is also connected to third switching structure 942. Switching structures 932, 937, 942 are coupled to terminal 363c of power converter stage 372 and to terminal N (neutral input terminal).

Figure 9B:
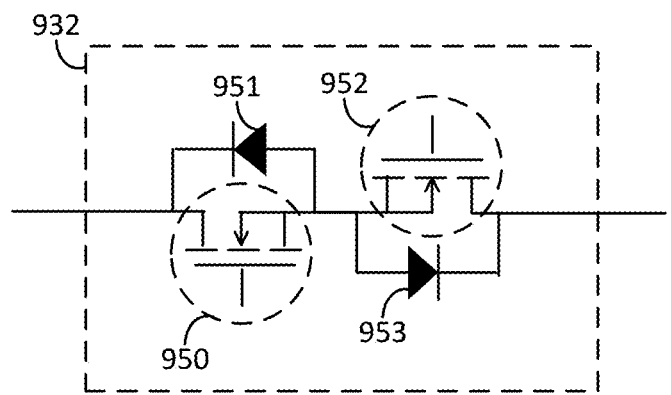

Switching structures of a Vienna rectifier circuit may be implemented in various ways. FIG. 9B shows an example of implementation of first switching structure 932 (switching structures 937, 942 may be identically implemented). In this example, switching structure is implemented by a pair of switches 950, 952 connected in series, with diode 951 coupled across terminals of switch 950 and diode 953 coupled across terminals of switch 952. Implementing switching structures 932, 937, and 942 using two-switch switching structures such as shown in FIG. 9B results in a six-switch Vienna recitifier. Other rectifier circuits may also be used.

Figure 10:
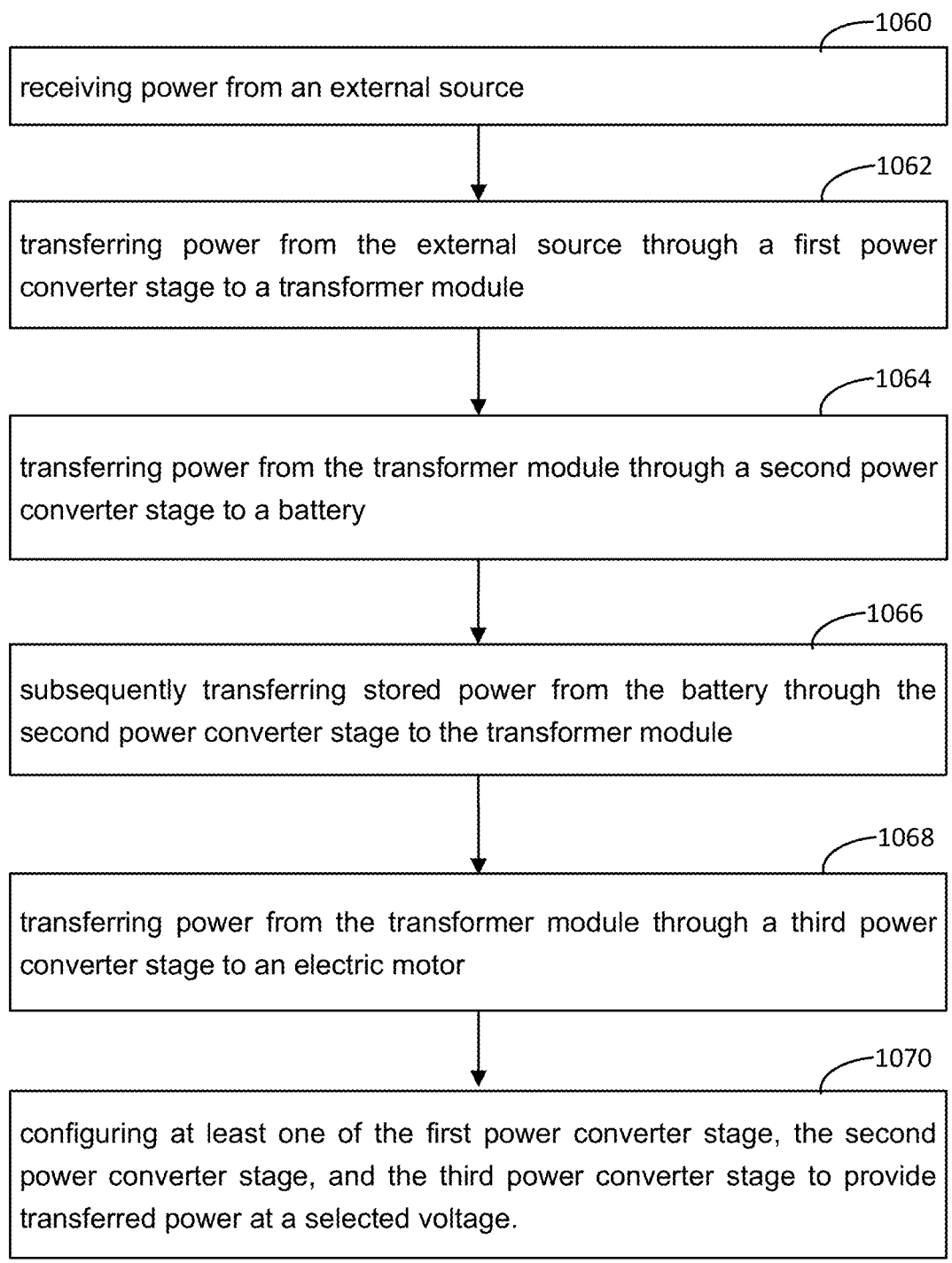
FIG. 10 illustrates a method according to an example of the present technology.

The circuits described above may be used in various ways. FIG. 10 illustrates one example of a method that may be implemented using one or more of the circuits described above. The method includes receiving power from an external source 1060, transferring power from the external source through a first power converter stage to a transformer module 1062, and transferring power from the transformer module through a second power converter stage to a battery 1064. The method includes subsequently transferring stored power from the battery through the second power converter stage to the transformer module 1066 and transferring power from the transformer module through a third power converter stage to an electric motor 1068. The method further includes configuring at least one of the first power converter stage, the second power converter stage, and the third power converter stage to provide transferred power at a selected voltage 1070.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto

What is claimed is:

1. An apparatus comprising:
   a transformer module;
   a first power converter stage connected between the transformer module and an external power port;
   a second power converter stage connected between the transformer module and a battery port;
   a third power converter stage connected between the transformer module and an electric motor port; and
   at least one of the first power converter stage, the second power converter stage, and the third power converter stage is a multi-level power converter stage that is configurable with multiple configurations to generate different output voltages from an input voltage and wherein the battery port is coupled to the electric motor port through the second and third power converter stages and the transformer module to provide power to an electric motor coupled to the electric motor port using power from a battery coupled to the battery port.

2. The apparatus of claim 1, wherein the first power converter stage is a multi-level power converter stage, the second power converter stage is a multi-level power converter stage, and the third power converter stage is a two-level converter.

3. The apparatus of claim 1 further comprising a rectifier and boost circuit coupled between the external power port and the first power converter stage to rectify and boost an alternating current (AC) input from the external power port to provide a direct current (DC) input to the first power converter stage.

4. The apparatus of claim 1, wherein the external power port is coupled to the battery port through the first and second power converter stages and the transformer module to charge a battery coupled to the battery port using external power received at the external power port.

5. The apparatus of claim 1, wherein the battery port is coupled to the electric motor port through the second and third power converter stages and the transformer module to provide power to an electric motor coupled to the electric motor port using power from a battery coupled to the battery port.

6. The apparatus of claim 5, wherein the third power converter stage includes output terminals coupled in series with the battery port to generate an output voltage to the electric motor port that is equal to battery port voltage from the battery plus an output voltage of the third power converter stage.

7. The apparatus of claim 1, further comprising a processor coupled to the first, second, and third power converter stages to select a configuration for the multi-level power converter stage for generating appropriate input and output voltage levels to maximize power conversion efficiency.

8. The apparatus of claim 7, wherein the first and second power converter stages and the transformer module form a resonant converter having a resonant frequency, the processor configured to select the configuration to maintain an operating frequency that is near the resonant frequency.

9. The apparatus of claim 1 wherein the transformer module consists of a transformer with a first winding coupled to the first power converter stage, a second winding coupled to the second power converter stage, and a third winding coupled to the third power converter stage, the first winding, the second winding, and the third winding wound about a common core.

10. The apparatus of claim 1 wherein the transformer module consists of a first transformer with a first winding coupled to the first power converter stage and a second winding coupled to the second power converter stage, and a second transformer with a third winding coupled to the third power converter stage and a fourth winding coupled to the second power converter stage, the first and second windings wound on a first core in the first transformer and the third and fourth windings wound on a second core in the second transformer.

11. The apparatus of claim 1, wherein the apparatus is in an electric vehicle that includes an electric motor to propel the electric vehicle, the electric motor coupled to the electric motor port, and includes one or more batteries coupled to the battery port to power the electric motor.

12. A method comprising:
   receiving power from an external source;
   transferring power from the external source through a first power converter stage to a transformer module;
   transferring power from the transformer module through a second power converter stage to a battery;
   subsequently transferring stored power from the battery through the second power converter stage and a third power converter stage to the transformer module;
   transferring power from the transformer module through a third power converter stage to an electric motor to provide power to the electric motor from the battery; and
   configuring at least one of the first power converter stage, the second power converter stage, and the third power converter stage to provide transferred power from the battery at a selected voltage.

13. The method of claim 12 wherein configuring includes configuring the first power converter stage in one of a plurality of available configurations and configuring the second power converter stage in one of the plurality of available configurations according to a voltage of the power from the external source to provide power to the battery at a predetermined voltage.

14. The method of claim 13 wherein receiving power from the external source includes receiving power as alternating current (AC) at a supply voltage, the method further comprising rectifying and boosting to obtain a direct current (DC) voltage that is higher than the supply voltage, the DC voltage provided to the first power converter stage.

15. The method of claim 14 wherein transferring power from the external source through the first power converter stage to the transformer module includes inverting the DC voltage to obtain a corresponding AC voltage and providing the corresponding AC voltage to the transformer module.

16. The method of claim 15 wherein the first power converter stage, the transformer module, and the second power converter stage form a resonant converter having a resonance frequency, the method further comprising:
- detecting a supply voltage of the power from the external source; and
- configuring the first power converter stage to generate the corresponding AC voltage having a frequency at or near the resonance frequency.

17. The method of claim 12 further comprising:
- while transferring power through the third power converter stage to generate a configurable voltage, transferring stored power from the battery at a battery voltage; and
- combining the battery voltage in series with the configurable voltage to obtain a combined voltage; and
- providing the combined voltage to the electric motor.

18. An electric vehicle comprising:
- an external power port to receive electrical power from an external power source;
- an electric motor to provide propulsion of the electric vehicle;
- a battery to store power from the external power source and to provide stored power to the electric motor; and
- an on-board charger and motor control unit comprising:
  - a transformer;
  - a first power converter stage connected between the transformer and the external power port;
  - a second power converter stage connected between the transformer and the battery;
  - a third power converter stage connected between the transformer and the electric motor; and
  - at least the first power converter stage and the second power converter stage are three-level power converter stages that is configurable to have multiple configurations to generate different output voltages from an input voltage and wherein the battery is coupled to the electric motor through the second and third power converter stages and the transformer to provide power to the electric motor.

19. The electric vehicle of claim 18 further comprising a processor coupled to select configurations for the first power converter stage and the second power converter stage according to a voltage received at the external power port.

20. The electric vehicle of claim 19 wherein the first power converter stage, the transformer, and the second power converter stage form a resonant converter with a resonance frequency, the processor coupled to select the configurations to convert the voltage received at the external power port to a battery charging voltage with frequency of the resonant converter close to the resonance frequency.

* * * * *